United States Patent
Raskar et al.

(10) Patent No.: US 7,443,443 B2
(45) Date of Patent: Oct. 28, 2008

(54) METHOD AND APPARATUS FOR ENHANCING FLASH AND AMBIENT IMAGES

(75) Inventors: Ramesh Raskar, Cambridge, MA (US); Amit Agrawal, Greenbelt, MD (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 638 days.

(21) Appl. No.: 11/191,809

(22) Filed: Jul. 28, 2005

(65) Prior Publication Data

US 2007/0024742 A1   Feb. 1, 2007

(51) Int. Cl.
  H04N 5/222   (2006.01)
  G06K 9/40   (2006.01)
  H04N 5/238   (2006.01)

(52) U.S. Cl. .............. 348/370; 348/224.1; 348/364; 348/366; 382/275

(58) Field of Classification Search .......... 348/223.1, 348/224.1, 227.1, 366, 370, 371; 362/1–5; 396/155, 164, 166, 167; 382/199, 274, 275, 382/278

See application file for complete search history.

(56) References Cited

U.S. PATENT DOCUMENTS 6,859,565 B2 * 2/2005 Baron ................... 382/275
6,907,193 B2 * 6/2005 Kollias et al. .............. 396/4
7,102,683 B2 * 9/2006 Perry et al. ............. 348/370

2002/0113882 A1 * 8/2002 Pollard et al. ............ 348/239

OTHER PUBLICATIONS

Agarwala, A., Dontcheva, M., Agrawala, M., Drucker, S., Colburn, A., Curless, B., Salesin, D., and Cohen, M. 2004. Interactive digital photomontage. *ACM Transactions on Graphics 23*, 3 (Aug.), 294-302.

Debevec, P. E., and Malik, J. 1997. Recovering high dynamic range radiance maps from photographs. In *Proceedings of the 24th annual conference on Computer graphics and interactive techniques*, ACM Press/Addison-Wesley Publishing Co., 369-378.

Durand, F., and Dorsey, J. 2002. Fast Bilateral Filtering for High-Dynamic-Range Images. In *Proceedings of SIGGRAPH 2002*, ACM SIGGRAPH, 257-266.

Eisemann, E., and Durand, F. 2004. Flash photography enhancement via intrinsic relighting. *ACM Transactions on Graphics 23*, 3 (Aug.), 673-678. 7.

Farid, H., and Adelson, E. H. 1999. Separating reflections and lighting using independent components analysis. In *1999 Conference on Computer Vision and Pattern Recognition (CVPR 1999)*, 1262-1267.

(Continued)

*Primary Examiner*—Ngoc-Yen Vu
*Assistant Examiner*—Carramah J Quiett
(74) *Attorney, Agent, or Firm*—Dirk Brinkman; Clifton D. Mueller; Gene V. Vinokur

(57) ABSTRACT

A method and system generate an enhanced output image. A first image is acquired of a scene illuminated by a first illumination condition. A second image is acquired of the scene illuminated by a second illumination condition. First and second gradient images are determined from the first and second images. Orientations of gradients in the first and second gradient images are compared to produce a combined gradient image, and an enhanced output image is constructed from the combined gradient image.

15 Claims, 15 Drawing Sheets

OTHER PUBLICATIONS

Fattal, R., Lischinski, D., and Werman, M. 2002. Gradient Domain High Dynamic Range Compression. In *Proceedings of SIGGRAPH 2002*, ACM SIGGRAPH, 249-256.

Finlayson, G. D., Drew, M. S., and Lu, C. 2004. Intrinsic Images by Entropy Minimization. In *ECCV*. FLASHHDR. High dynamic range flash photos by varying flash power but keeping exposure constant.

Grossberg, M. D., and Nayar, S. K. 2003. High dynamic range from multiple images: Which exposures to combine? In *Workshop on Color and Photometric Methods in Computer Vision*. Kodak, 2001. CCD image sensor noise sources. Application note MPT/PS-0233.

Levin, A., Zomet, A., and Weiss, Y. 2004. Separating reflections from a single image using local features. In *2004 Conference on Computer Vision and Pattern Recognition (CVPR 2004)*.

Lichtenauer, J., Reinders, M., and Hendriks, E. 2004. Influence of The Observation Likelihood Function on Particle Filtering Performance in Tracking Applications. In *Sixth IEEE International Conference on Automatic Face and Gesture Recognition*, 767-772.

Mann, S., and Picard, R. W. 1995. Being undigital with digital cameras: Extending dynamic range by combining differently exposed pictures. In *Proceedings of IS and T 46th annual conference*, 422-428.

Mitsunaga, T., and Nayar, S. K. 1999. Radiometric Self Calibration. In *IEEE CVPR*.

Nayar, S. K., Fang, X.-S., and Boult, T. 1997. Separation of reflection components using color and polarization. *International Journal of Computer Vision 21*, 3 (Feb.), 163-186.

Perez, P., Gangnet, M., and Blake, A. 2003. Poisson image editing. In *Proceedings of SIGGRAPH 2003*, 313-318.

Petschnigg, G., Szeliski, R., Agrawala, M., Cohen, M., Hoppe, H., and Toyama, K. 2004. Digital photography with flash and no-flash image pairs. *ACM Transactions on Graphics 23*, 3 (Aug.), 664-672.

Raskar, R., Ilie, A., and Yu, J. 2004. Image Fusion for Context Enhancement and Video Surrealism. In *Proceedings of NPAR*.

Reinhard, E., Stark, M., Shirley, P., and Ferwerda, J. 2002. Photographic Tone Reproduction for Images. In *Proceedings of SIGGRAPH 2002*, ACM SIGGRAPH, 267-276.

Schechner, Y. Y., Kiryati, N., and Basri, R. 2000. Separation of transparent layers using focus. *International Journal of Computer Vision 39*, 1 (Aug.), 25-39.

Sun, J., Jia, J., Tang, C.-K., and Shum, H.-Y. 2004. Poisson matting. *ACM Trans. Graph. 23*, 3, 315-321.

Szeliski, R., Avidan, S., and Anandan, P. 2000. Layer extraction from multiple images containing reflections and transparency. In *2000 Conference on Computer Vision and Pattern Recognition (CVPR 2000)*, 246-243. Toomas Tamm, 1997.

Discharge Curves of Electronic Flash at Different Power Settings. http://www.chem.helsinki.fi/ toomas/photo/flash-discharge/regular. html, Jul. 7, 1999.

\* cited by examiner

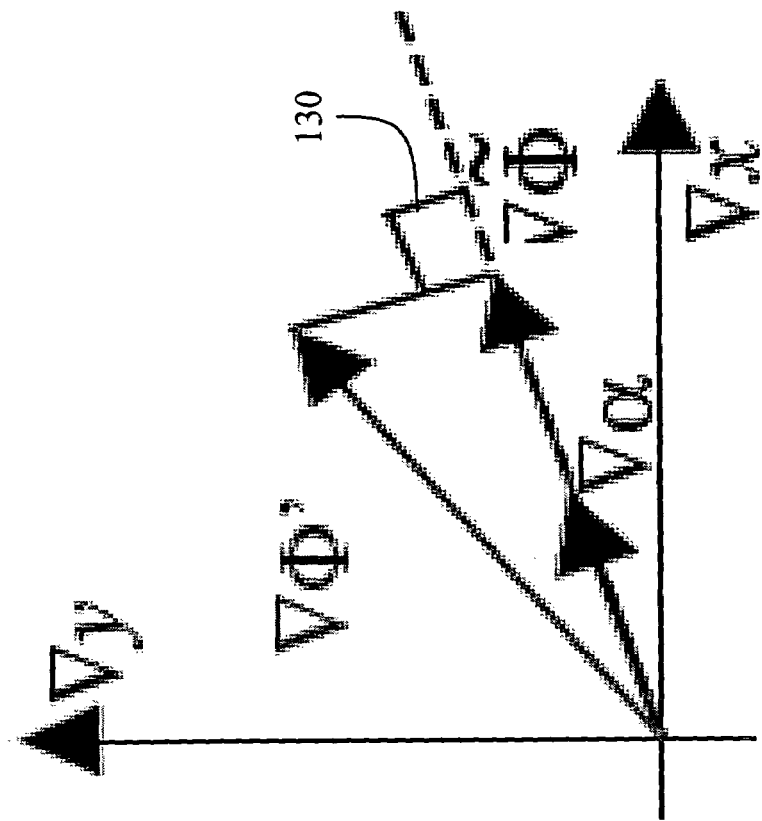
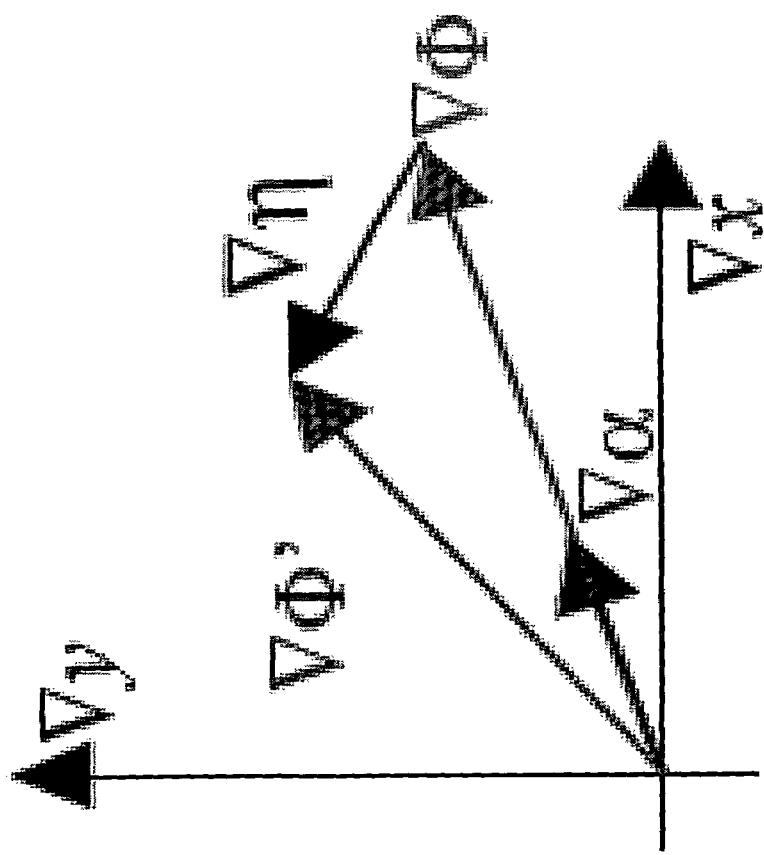
*Fig. 3B*
*Fig. 3A*

METHOD AND APPARATUS FOR ENHANCING FLASH AND AMBIENT IMAGES

FIELD OF THE INVENTION

The invention relates generally to computer graphics, and more particularly to enhancing images acquired of a scene with ambient and flash unit illumination.

BACKGROUND OF THE INVENTION

Flash units are often used to acquire an image of a scene under low-light conditions. However, flash units produce a variety of undesirable effects and artifacts. Objects near the flash unit tend to be over-exposed, while distant objects tend to be under-exposed because the flash intensity decreases as the square of the distance from the camera.

Furthermore, flash units also produce undesirable reflections. Often, one sees the reflection of an object that lies outside the field of view of the camera but is strongly lit by the flash unit, or by a specular object within the field of view. Even more often, one sees strong highlights due to reflections by glossy objects in the scene.

Images acquired of shallow-depth, indoor scenes with flash units can have significantly enhanced details and reduced noise compared to images acquired with just ambient illumination, Eisemann and Durand, "Flash photography enhancement via intrinsic relighting," ACM Transactions on Graphics 23, 3 (Aug.), 673-678, 2004; and Petschnigg, et al., "Digital photography with flash and no-flash image pairs," ACM Transactions on Graphics 23, 3 (Aug.), 664-672, 2004. Methods to remove flash shadows, reduce redeye, and perform white balancing are known. Most prior art methods operate on images acquired of indoor scenes with shallow depth ranges. In such cases, the flash unit adequately illuminates most objects in the scene.

It is desired to enhance images of indoor and outdoor scenes with large variations in depth and significant variations in ambient illumination.

Noise in a flash image can actually be higher than that in an ambient image for distant objects. To enhance the ambient image, prior art methods have used variants of a joint bilateral filter.

A number of methods are know for enhancing images using high dynamic range (HDR) images, image gradients, and other techniques. See Mann and Picard, "Being undigital with digital cameras: Extending dynamic range by combining differently exposed pictures," Proceedings of IS and T 46th annual conference, 422-428, 1995; Debevec and Malik, "Recovering high dynamic range radiance maps from photographs," Proceedings of the 24th annual conference on Computer graphics and interactive techniques, ACM Press/Addison-Wesley Publishing Co., 369-378, 1997; Fattal, et al., "Gradient Domain High Dynamic Range Compression," Proceedings of SIGGRAPH 2002, ACM SIGGRAPH, pp. 249-256, 2002; Perez, et al., "Poisson image editing," Proceedings of SIGGRAPH 2003, pp. 313-318, 2003; Raskar, et al., "Image Fusion for Context Enhancement and Video Surrealism," Proceedings of NPAR, 2004; Agarwala, et al., "Interactive digital photomontage," ACM Transactions on Graphics 23, pp. 294-302, August 2004; Sun, et al., "Poisson matting," ACM Trans. Graph. 23, pp. 315-321, 2004. It should be noted that, in the prior art, HDR images are generally acquired by varying the shutter exposure time for each image.

Some prior art methods remove reflections from flash images by decomposing the flash image into diffuse and specular components using a polarization filter, by changing focus, or by changing viewpoint, Nayar, et al., "Separation of reflection components using color and polarization," International Journal of Computer Vision 21, pp. 163-186, February 1997; Schechner, et al., "Separation of transparent layers using focus," International Journal of Computer Vision 39, pp. 25-39, August 2000; Farid and Adelson, "Separating reflections and lighting using independent components analysis," 1999 Conference on Computer Vision and Pattern Recognition (CVPR 1999), pp. 1262-1267, 1999; and Szeliski, et al., "Layer extraction from multiple images containing reflections and transparency," 2000 Conference on Computer Vision and Pattern Recognition (CVPR 2000), pp. 2000. A belief propagation based method minimizes the number of edges in a reflection-free decomposition of a single image, Levin, et al., "Separating reflections from a single image using local features," 2004 Conference on Computer Vision and Pattern Recognition (CVPR 2004), 2004.

On-board sensing and processing allows modern cameras to automatically select the flash power and shutter exposure time setting based on aggregate measurements of scene brightness and distance. For example, the Canon A-TTL camera uses a pre-flash and a photo-sensor sensor on the flash unit to determine the illumination that is needed for the scene. The Nikon-3D camera system uses camera-to-subject distance to focus the lens. This information can also be used to determine the flash power and exposure. It is important to note that in all these cases the selected flash and exposure settings for a particular image do not necessarily ensure that all objects in the scene are adequately illuminated. Furthermore, those settings are entirely based on sensing geometry and ambient lighting in the scene before an image is acquired, and do not consider the actual effect of flash illumination. Also these settings are non-adaptive. These methods do not consider the effect of prior images captured while capturing multiple images for a HDR scene.

SUMMARY OF THE INVENTION

It is an object of one embodiment of the invention to enhance flash and ambient images acquired of a scene.

It is an object of one embodiment of the invention to produce high dynamic range flash images.

It is an object of one embodiment of the invention to estimate camera settings adaptively.

Flash images are known to have several problems. Nearby objects tend to be over-exposed in the flash image, while distant objects are under-exposed. Nearby objects also cause reflections, and can have strong highlights.

A coherence model relates intensity gradients in the flash image to gradients in the ambient image. This model is invariant under changing illumination conditions that are present in the flash image and the ambient image.

Based on the coherence model, a gradient projection reduces components of the image gradients that are due to undesirable reflections and highlights as a result from the use of a flash unit. A brightness ratio based process compensates for illumination differences at different depths.

In many practical applications, a quality of the flash image and the ambient image can be limited in terms of the dynamic range of the camera. In such applications multiple images are acquired with different flash intensities to provide well-lit (HDR) flash images.

The well-lit images can be analyzed, and are adaptively sampled to minimize the number of images needed to be acquired for a scene. Methods that enhance the quality of images are also provided.

The ratio of brightness in the flash image and the ambient image represents a combined effect of depth and surface orientation. Using this ratio, a flash image can be modified to reduce the effects of over- and under-exposure as the depth increases.

BRIEF DESCRIPTION OF THE DRAWINGS

FIGS. 3A and 3B are gradient vectors and combined gradient vectors according to an embodiment of the invention;

DETAILED DESCRIPTION OF THE PREFERRED EMBODIMENT

Figure 1:
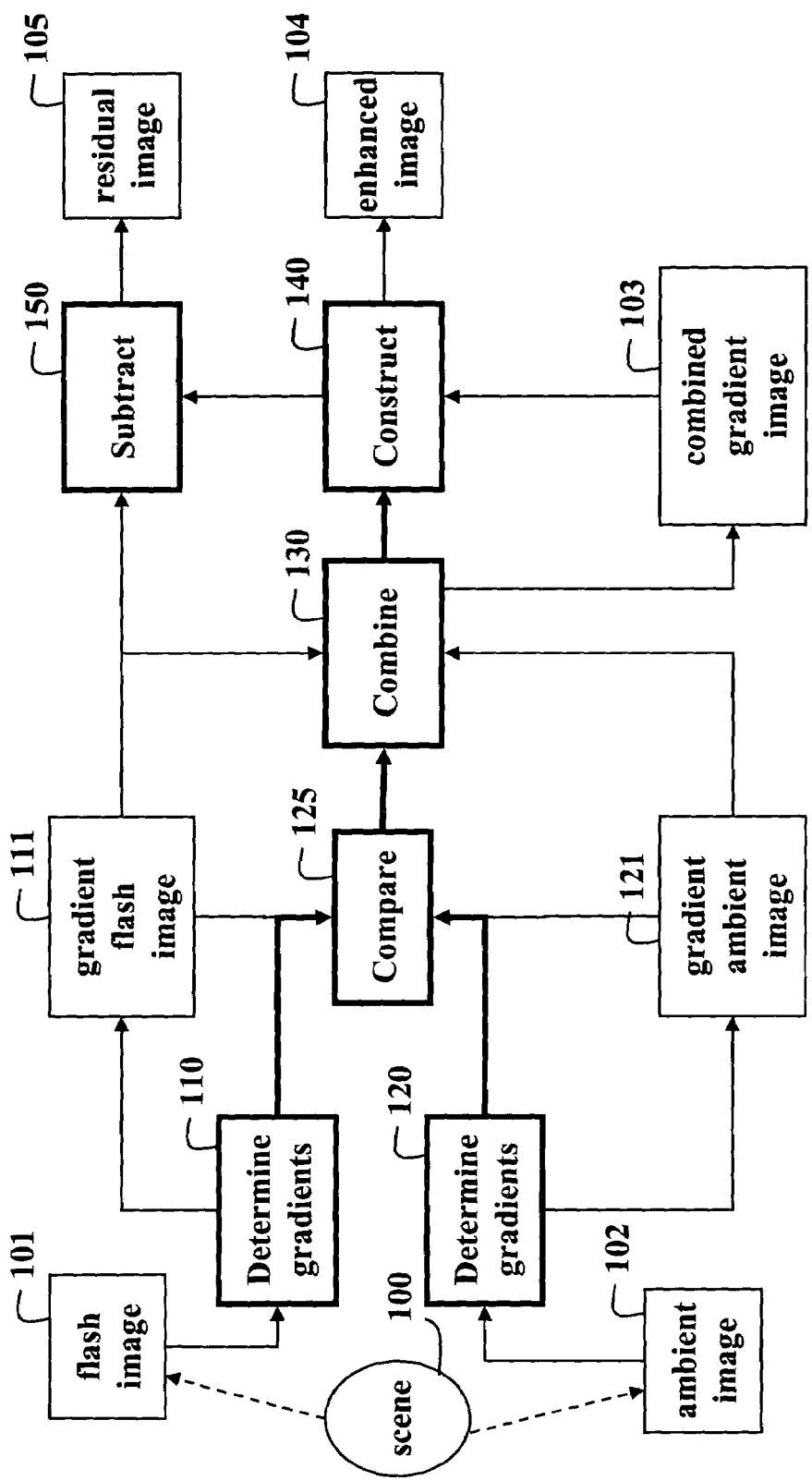
FIG. 1 is a block diagram of a method and system for enhancing images according to an embodiment of the invention.

FIG. 1 shows a method and system for enhancing images according to one embodiment of the invention. A flash image 101 is acquired of a scene 100 by a camera. In this case, the scene is illuminated with a first lighting condition, e.g., a flash unit. Gradient flash images 111 are determined 110 from the flash image. An ambient image 102 is acquired of the scene by the camera. In this case, the scene is illuminated by a second lighting condition, e.g., the ambient light. Gradient ambient images 121 are determined 120 for the ambient image.

In the case that the scene is also illuminated by ambient light while acquiring the flash image, the relative amount of ambient light is relatively small. Therefore, the contribution due to ambient light can either be ignored, or a 'pure' flash image can be obtained by subtracting the ambient image from the flash image when some ambient light is present in the scene.

The first and second example lighting conditions for the embodiments of the invention are described as being flash and ambient lighting. It should be noted that other lighting conditions, for example, bright light from one or more point light sources, moderate ambient light, natural light, artificial light, different lighting directions, different wavelengths (colors), sunlight, moonlight, diffuse (foggy) light, and the like, can also be used.

As defined herein, a gradient image, generally, has the x and the y gradients for the intensity at each pixel in the image. Image gradients are well known in the art. Numerous methods are known on how to determine image gradients, see J. D. Foley, A. van Dam, S. K. Feiner, and J. F. Hughes, *Computer Graphics: Principles and Practice*, second edition, Reading, Mass., Addison-Wesley, 1990, incorporated herein by reference.

Figure 2:
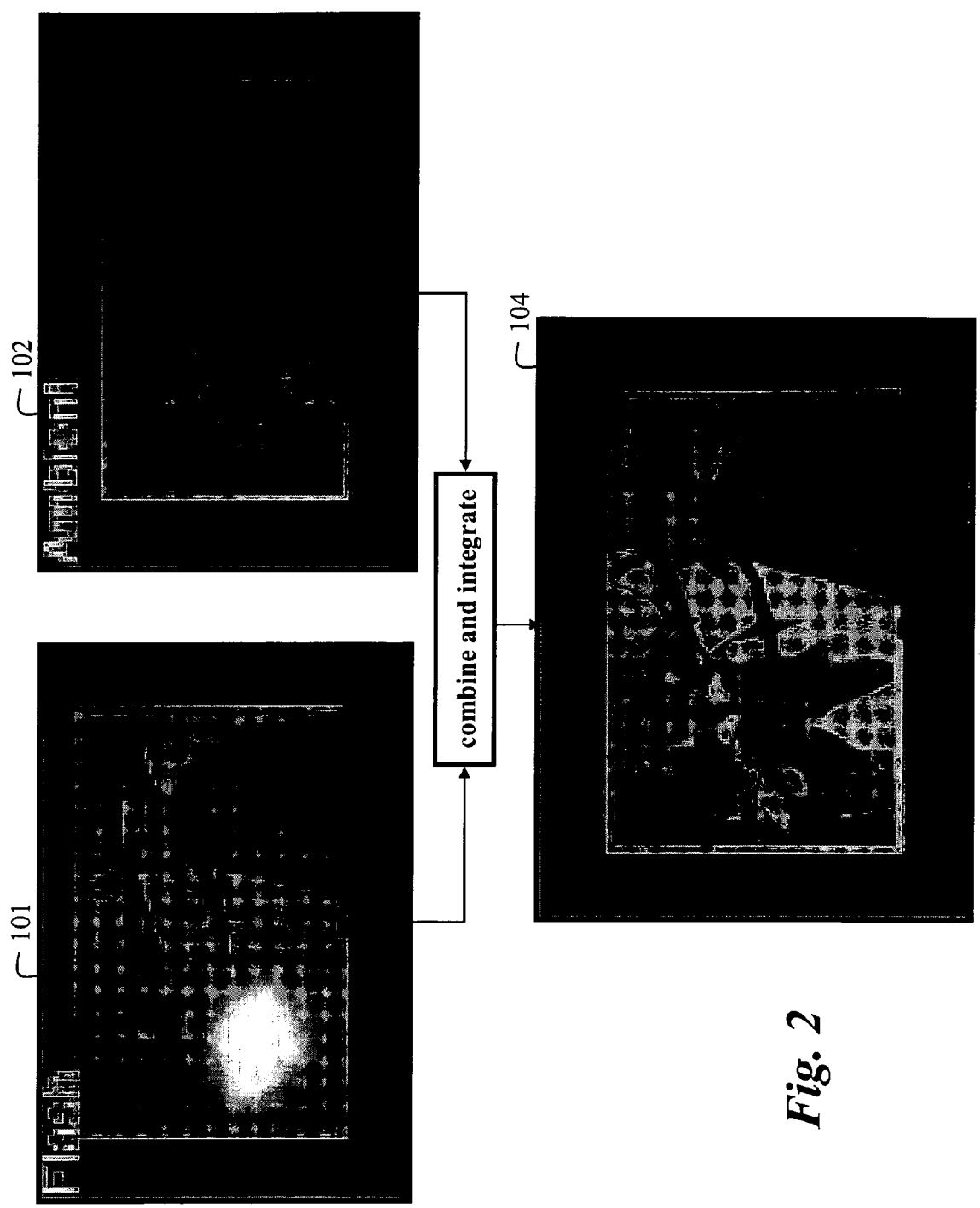
FIG. 2 is a block diagram of a method for combining flash and ambient images according to an embodiment of the invention.

The gradient flash images 111 and the gradient ambient images 121 can be compared 125 and then combined 130 to produce a combined gradient image 103. In one embodiment, the comparing 125 considers the orientation of gradient vectors in the gradient images. The gradients in the combined gradient image 103 are integrated to construct 140 an enhanced output image 104 of the scene, see FIG. 2.

The invention is based on the following principles.

Imaging Model

Radiance acquired from the scene 100 with flash photography is a linear combination of radiance $\Phi$ due to flash illumination with a power P, and radiance $\alpha$ due to ambient illumination. A flash image F is the flash radiance map $\Phi$ scaled by the flash power P for a unit of shutter exposure. An ambient image A is the ambient radiance map $\alpha$ scaled by an exposure time E. Scales P and E are constant for all pixels.

An irradiance map I of a linear response camera for a given wavelength is given by $$I = F + A = \Phi P + \alpha E. \quad (1)$$

We assume that the flash duration, e.g., one millisecond, is significantly shorter than the exposure time E, e.g., tens or hundreds of milliseconds. Because the camera and flash unit are fixed in position, Equation (1) is valid independent of scene reflectance due to diffuse, specular or transparent objects in the scene; geometry, i.e., near or distant; or medium, e.g., air, fog, underwater or glass.

The image irradiance at a point with a bidirectional reflectance distribution function, $\Psi$, in a direction $\omega_r$, is given by $$L(\omega_r) = \int_{106} \Psi(\omega_i, \omega_r) L_i(\omega_i) \cos\theta_i d\omega_i.$$

The incident irradiance term $L_i(\omega_i)$ includes flash and ambient terms within a hemisphere, $\Omega$, and $\theta_i$ is an angle between surface normal and incident irradiance.

Specifically, for a diffuse object with reflectance $\rho$, the component due to ambient illumination is $$\alpha = \int_{\Omega} \Psi(\rho/\pi) L(\omega) \cos\theta d\omega = \rho B/\pi, \quad (2)$$

where B is the aggregated ambience. Thus, ambient component $\alpha$ depends on scene reflectivity and ambient illumination. The component for flash image is $$\Phi = \rho \cos\theta_F/(\pi d^2). \quad (3)$$

The flash component depends on scene reflectivity, distance d from the flash unit, and the angle between flash direction and surface orientation, $\theta_F$.

Because the flash illumination decreases with distance from the flash unit, we expect distant or dark objects to have a low radiance value, and near and bright objects to have a high radiance value.

The flash-ambient image pair 101-102 can be used to estimate the components $\Phi$ and $\alpha$, up to an unknown scale factor for the entire image. In practice, however, the flash or the ambient image can have a very low quality, due to a limited dynamic range of the camera.

Flash Image Artifacts

We determine properties of the scene that remain invariant under changes of illumination and use these properties to detect flash artifacts such as reflections, highlights and hot spots. Correlation and brightness ratios are commonly used to find the similarity of corresponding image patches.

We provide a coherence model based on the orientation of the gradient vectors in the flash and the ambient images.

Gradient Orientation Coherence

Orientations of image gradients remain relatively stable under variable illumination when the gradients are due to local changes in reflectance and geometric shape, and not due to local changes in illumination.

Although we have two illumination conditions, flash illumination can be a special case when the flash unit is proximate to the camera center. Flash illuminates the scene with very few shadows, apart from those at depth edges. Hence, in general, we expect flash image gradient orientations to be coherent with ambient image gradient orientations, except for flash artifacts and ambient shadow edges. Thus, comparing the gradient vector orientations can indicate flash artifacts.

This coherence exists not only at the intensity edges but also at nearly all the pixels in the images. Because the gradient direction at very low magnitude is unstable, we exclude pixels with gradient magnitudes below 0.005, when intensity values are normalized in a range [0, 1].

Let $$M = \frac{|\nabla \Phi \cdot \nabla \alpha|}{|\nabla \Phi||\nabla \alpha|}$$

denote a coherency map between the flash and ambient radiance components $\Phi$ and $\alpha$. Thus, the coherence map $M(x, y)$ encodes the angular similarity of flash and no-flash image gradient vectors at pixels $(x, y)$.

Although the pixel intensities in the flash and ambient images are quite different, gradient orientation coherence indicates that the gradient vectors in the flash and ambient images have the same orientations but different magnitudes. Hence, the gradients $\nabla$ are related by an unknown scalar value k. Thus, the gradient coherence model is $$\nabla \Phi = k \nabla \alpha.$$

The scalar value k is not the same for all the pixels. However, the scalar value k is independent of reflectance. Hence, the scalar value k is relatively smooth over a smooth surface. The scalar value k is positive at reflectance gradients. However, the scalar value can become negative at depth edges and increases where the polarity of the gradient reverses. In either case, the orientation within an angular range $[0, \pi]$ remains stable. As described below, the flash image or the ambient image exhibits artifacts such as reflections, hotspots due to direct reflection of the flash, and specularities.

As shown in FIGS. 3A and 3B, these artifacts can be modeled as unknown noise to generate new gradients $\nabla \alpha'$ and $\nabla \Phi'$ as $$\nabla \alpha' = \nabla \alpha + \nabla \eta_A$$

$$\nabla \Phi' = \nabla \Phi + \nabla \eta_F = k \nabla \alpha + \nabla \eta_K. \quad (4)$$

FIG. 3A shows the relationship between the gradient in the ambient and flash images. The gradient flash image $\Phi$ is corrupted by noise $\eta$. FIG. 3B shows how noise $\eta$ orthogonal to $\nabla \alpha$ can be removed by the combining 130, which essentially is a projection.

Decomposing the single flash image $\Phi'$ into two images, $\Phi$ and $\eta_F$, is an ill-posed problem. We have two equations and four unknowns. It is possible to recover the undistorted components from this under-constrained problem by analyzing the gradient coherence and taking a vector projection without explicitly estimating the scalar value k.

The gradient at a pixel in an image is caused by variations in reflectance, surface orientation, depth or illumination. Reflectance gradients preserve orientation, but illumination gradients do not. Gradients due to geometry also preserve orientation except for low magnitude gradients.

The gradient at a pixel, $\nabla I_{x,y} = (G_x, G_y)$ has an orientation $\tan^{-1}(G_x/G_y)$. By substituting values for $\Phi$ and $\alpha$, we can compare the gradient ratio $G_x/G_y$ for the flash image 101 and the ambient image 102.

For a reflectance gradient on a smooth surface, the surface normal and viewing direction are constant so that $\cos \phi$, d and B are the same at the pixels $(x, y)$, $(x+1, y)$ and $(x, y+1)$. The ratio in both images is equal, because, $$\frac{\Phi_{x,y+1}P - \Phi_{x,y}P}{\Phi_{x+1,y}P - \Phi_{x,y}P} = \frac{\alpha_{x,y+1}E - \alpha_{x,y}E}{\alpha_{x+1,y}E - \alpha_{x,y}E} = \frac{\rho_{x,y+1} - \rho_{x,y}}{\rho_{x+1,y} - \rho_{x,y}}.$$

Hence, the orientation of the gradient is invariant. The scaling for terms for P and E can be ignored for simplicity because the terms do not affect the orientation of the gradient. For an illumination gradient on a smooth surface caused by ambient illumination in the ambient image, but not in the flash image, the ratio is different. Without loss of generality, let the illumination edge pass through pixel $(x, y)$ and $(x+1, y)$. This causes a different ratio than in the equation above and is given by, $$\frac{\rho_{x,y+1} - \rho_{x,y}}{\rho_{x+1,y}(B_{x+1,y}/B_{x,y}) - \rho_{x,y}}.$$

Hence, coherence at illumination gradients is low. At depth edges, sometimes the background is illuminated better in the ambient image than in the flash image, and, hence, the polarity of the orientation can change. But at high gradients, the orientation of the edge remains the same. However, at low intensity gradients, the gradient orientation at depth edges can change. The coherency map M encodes the angular similarity of flash and no-flash image gradient vectors.

Gradient Combining

By removing components of the noise gradient vector orthogonal to the signal gradient vector, the visual effect of the noise can be significantly reduced. We first analyze the effect of rotating the gradients of an image by an angle $\phi$. Let $G = [G_x, G_y]$ denote the gradient field of an image I. At each pixel, the gradients are rotated by the angle $\phi$ to generate a new gradient field $G' = [G'_x, G'_y]$ given by $$G'_x = \cos(\phi)G_x - \sin(\phi)G_y, \text{ and}$$

$$G'_y = \sin(\phi)G_x + \cos(\phi)G_y. \quad (5)$$

Let I' denote the image constructed from $[G'_x, G'_y]$, which is obtained by solving a Poisson equation $\nabla^2 I' = \text{div}(G')$, where div denotes the divergence operator. The divergence of a 2D vector field G' is given by $\text{div}(G') = (\partial G_x/\partial_x) + (\partial G_y/\partial_y)$. Substituting the expression for $G'_x$ and $G'_y$, we obtain $$div(G') = \cos(\varphi)\left(\frac{\partial G_x}{\partial x} + \frac{\partial G_y}{\partial y}\right) + \sin(\varphi)\left(\frac{\partial G_x}{\partial y} - \frac{\partial G_y}{\partial x}\right) \quad (6)$$
$$= \cos(\varphi) \times div(G) - \sin(\varphi) \times curl(I)$$
$$= \cos(\varphi) \times div(G)$$

because the curl of a scalar field is always zero. Thus, by rotating the image gradients by the angle φ, the divergence of the gradient field decreases by a factor of cos(φ). Hence, at an angle φ=π/2, the divergence is zero for any image.

This proves that removing a gradient component orthogonal to an image does not remove anything from the image. Hence, we can eliminate the component of noise orthogonal to the signal by the combining 130.

Herein, we use the symbol → when the combining 130 is a projection. Thus, as shown in FIG. 3B the projection 130 of the flash image gradients 111 onto ambient image gradients 112 is given by $$\nabla\Phi = (\nabla\Phi' \to \nabla\alpha) = \nabla\alpha(\nabla\Phi' \cdot \nabla\alpha)/\|\nabla\alpha\|^2$$

The vector ∇Φ is along the vector ∇Φ and includes an unknown scale factor. However, the removed part is orthogonal to the vector ∇Φ.

Thus, the combining 130 enables us to remove the component of the reflection signal for which the noise ∇η is orthogonal to ∇Φ.

Reflection Removal

We describe a number of applications of the gradient combining based removal of flash artifacts.

Figure 4A:
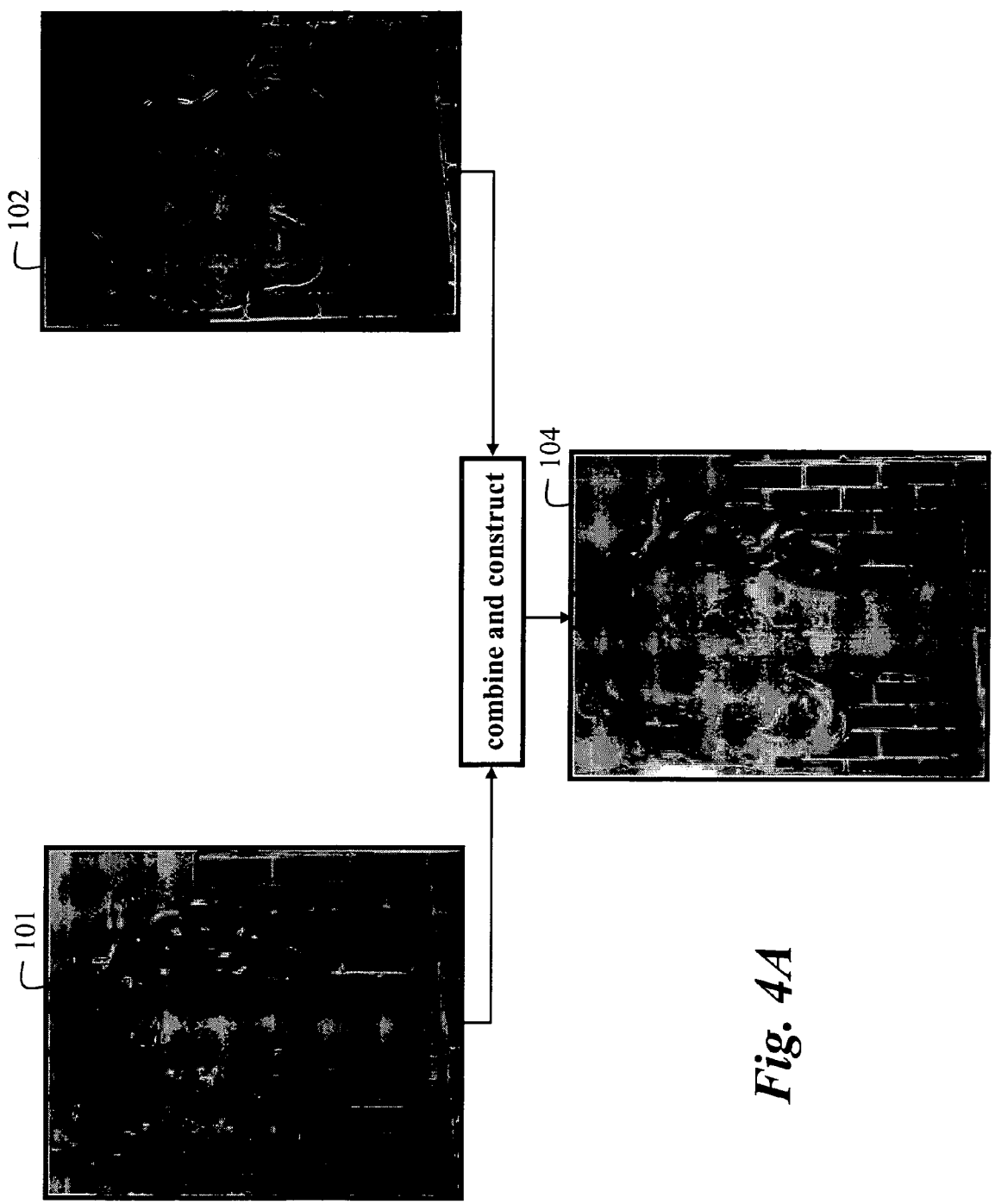
FIG. 4A is a block diagram of a method for combining flash and ambient images according to an embodiment of the invention.

When acquiring an image of a scene including a transparent layer such as a window, a protective varnish coating or glass in front of paintings, the flash image frequently includes unintended reflections or a hotspot. In some cases, the flash unit is intended to illuminate what is behind the glass, e.g., merchandise in a store. In other cases, the goal is to illuminate object in front of the glass. In some cases, even the ambient image includes reflections. Under certain conditions, the reflections can be reduced by using the flash image 101, as shown in FIG. 4A.

Referring back to Equation (4), we assume that only one image in the flash and ambient image pair is corrupted in a given region, so there are three unknowns and two equations.

Scene Behind Transparent Layer

In this application, the flash is intended to illuminate the scene behind the glass. However, reflections from objects in front of the glass can appear as artifacts. Hence, $\eta_A=0$, $\eta_F$ is non-zero, and ∇Φ and ∇α are coherent everywhere, except where a flash reflection $\eta_F$ is present. The goal is to construct the reflection free image 104.

To achieve this, we obtain a new gradient field ∇Φ* by projecting 130 the flash gradients 111 onto the ambient gradients 112 according to:

$$\nabla\Phi^* = (\nabla\Phi' \to \nabla\alpha).$$

The artifact free image 104 is constructed 140 by integrating the combined gradients ∇Φ* 103.

Scene in Front of Reflective Layer

In this application, an object, e.g. a person, is positioned in front of a reflective layer, such as a window or glass covered painting. The portion of the scene behind the reflective layer is well lit by ambient illumination. However, a flash is required to illuminate the dimly lit foreground object. Thus, in terms of Equation (4), $\eta_A=0$, $\eta_F$ is non-zero, and ∇Φ and ∇α are coherent everywhere, except where a flash reflection $\eta_F$ is present. The goal is to construct a reflection free image 104.

We obtain a new gradient field ∇Φ*, by linearly combining flash and ambient image gradients using weights $w_s$ and the gradient coherency map and saturation maps according to $$\nabla\Phi^* = w_S\nabla\alpha + 1(1-w_S)(M\nabla\Phi' + (1-M)\nabla\alpha.$$

Figure 4B:
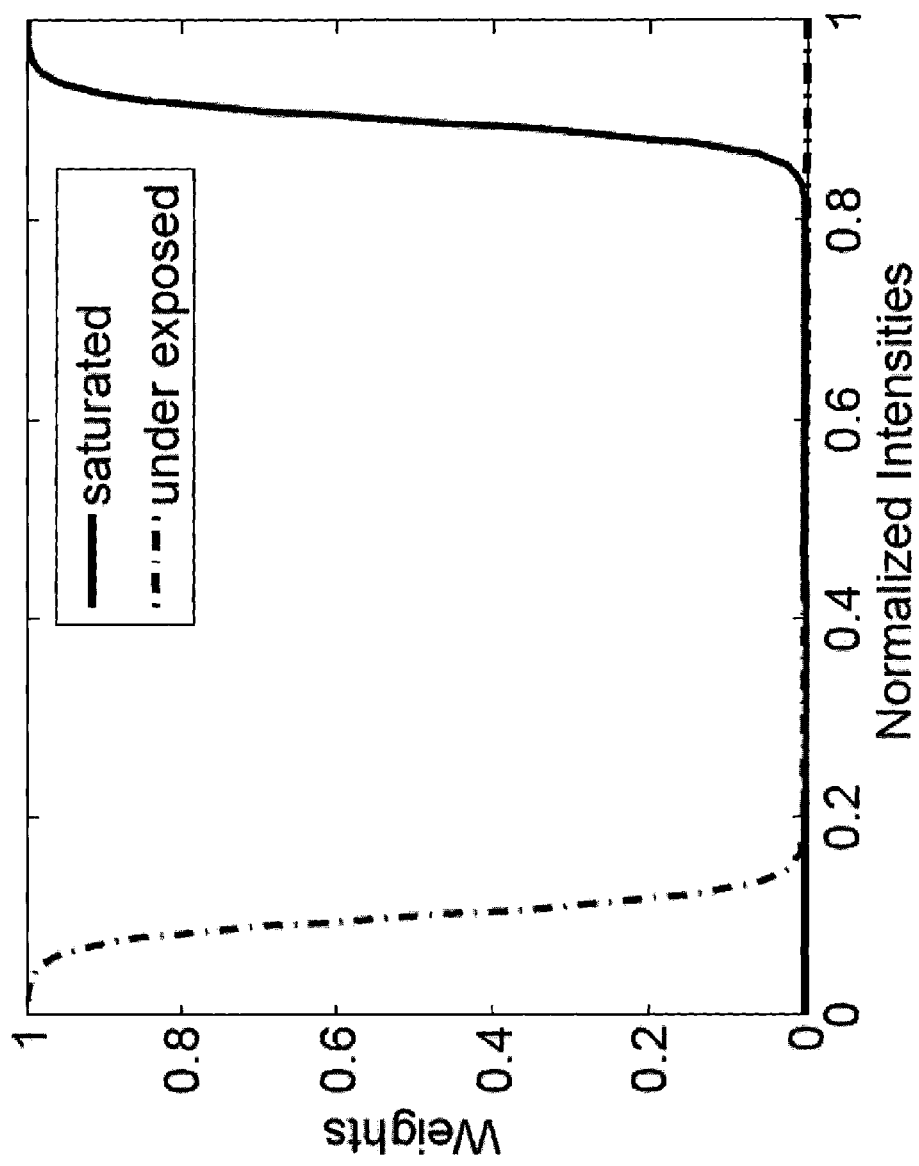
FIG. 4B is a graph of weights as a function of normalized intensities.

FIG. 4B shows the weights as a function of normalized pixel intensities for saturated and unsaturated pixels. Then, the artifact free image 104 is constructed by integrating the combined gradients ∇Φ* 103.

Self Reflection

The flash image can also be used to remove reflections in the ambient image. For example, while photographing a well lit painting, often reflections are visible in the ambient image. To minimize the reflections, a low exposure flash image could be taken. However, the flash can cause a hot spot. The goal here is to recover a reflection free image, without the hot spot caused by the flash unit.

Thus, in terms of Equation (4), $\eta_A$ is non-zero, $\eta_F$ is non-zero at the hot spot, and ∇Φ and ∇α are coherent everywhere, except at the hot spot and the ambient reflection.

Using the combining 130, in this case, we take the projection of the ambient gradients onto the flash gradients. Because the projection of the ambient gradients onto the flash gradients cannot be taken where the flash gradients are unreliable, e.g., at hotspot, we assume no reflections there, and use the original ambient gradients at those pixels. Thus the new gradient field 103, in this case, is $\nabla\alpha^* = w_S\nabla\alpha' + (1-w_S)(\nabla\alpha' \to \nabla\Phi)$.

We apply 2D integration to the gradient fields to construct 140 an artifact free image. The integration can use a direct method as described by Elder, "Are Edges Incomplete?" International Journal of Computer Vision 34, 2/3, pp. 97-122, 1999; Fattal, et al., "Gradient Domain High Dynamic Range Compression," Proceedings of Siggraph, ACM SIGGRAPH, 2002; and U.S. patent application Ser. No. 10/392,429, filed by Raskar, et al. on Mar. 19, 2003, "Enhancing Low Quality Images of Naturally Illuminated Scenes," all incorporated herein by reference. An estimate of an image intensity function I' from gradients G so that G=∇I, can be obtained by solving the Poisson equation $\nabla^2 I = div G$ where $\nabla^2$ is the Laplace operator and "div" is the divergence operator. The Poisson equation can be solved using a full multigrid method, see Press, et al., "Numerical Recipes in C: The Art of Scientific Computing", Pearson Education, 1992, incorporated herein by reference.

Residual Image

Interestingly, one can also recover the noise or the reflection layer, generally a residual image 105, by integrating the residual gradients, which are obtained by subtracting 150 the combined gradients 103 from the flash image gradients 111.

In the case of a self reflection, the gradients of the reflection layer $\eta_A$ can be obtained by $$\nabla\eta_A = (1-w_S)[\nabla\alpha' - (\nabla\alpha' - \nabla\Phi)].$$

Figure 5:
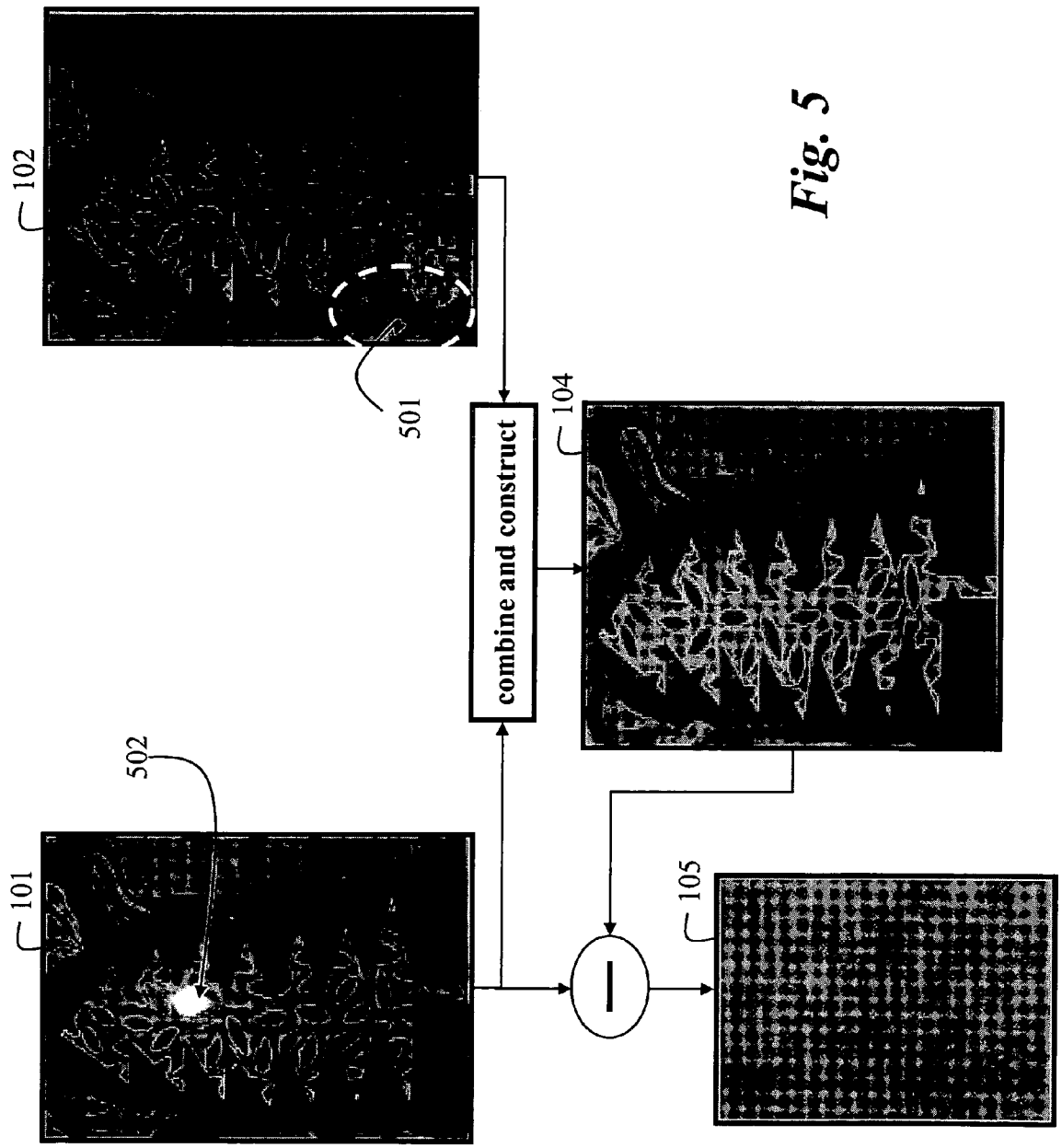
FIG. 5 is a block diagram of a method for combining flash and ambient images according to an embodiment of the invention.

FIG. 5 shows images taking by a photographer standing in front of a glass covered painting. The reflection of the photographer's arm 501 is visible in the ambient image 102 but not in the flash image 101. However, the flash image includes a hot spot 502. Neither is visible in the enhanced image 104. The photographer and the flash unit are both visible in the residual image 105.

Scene in Front of Reflective Layer at Night

Figure 6:
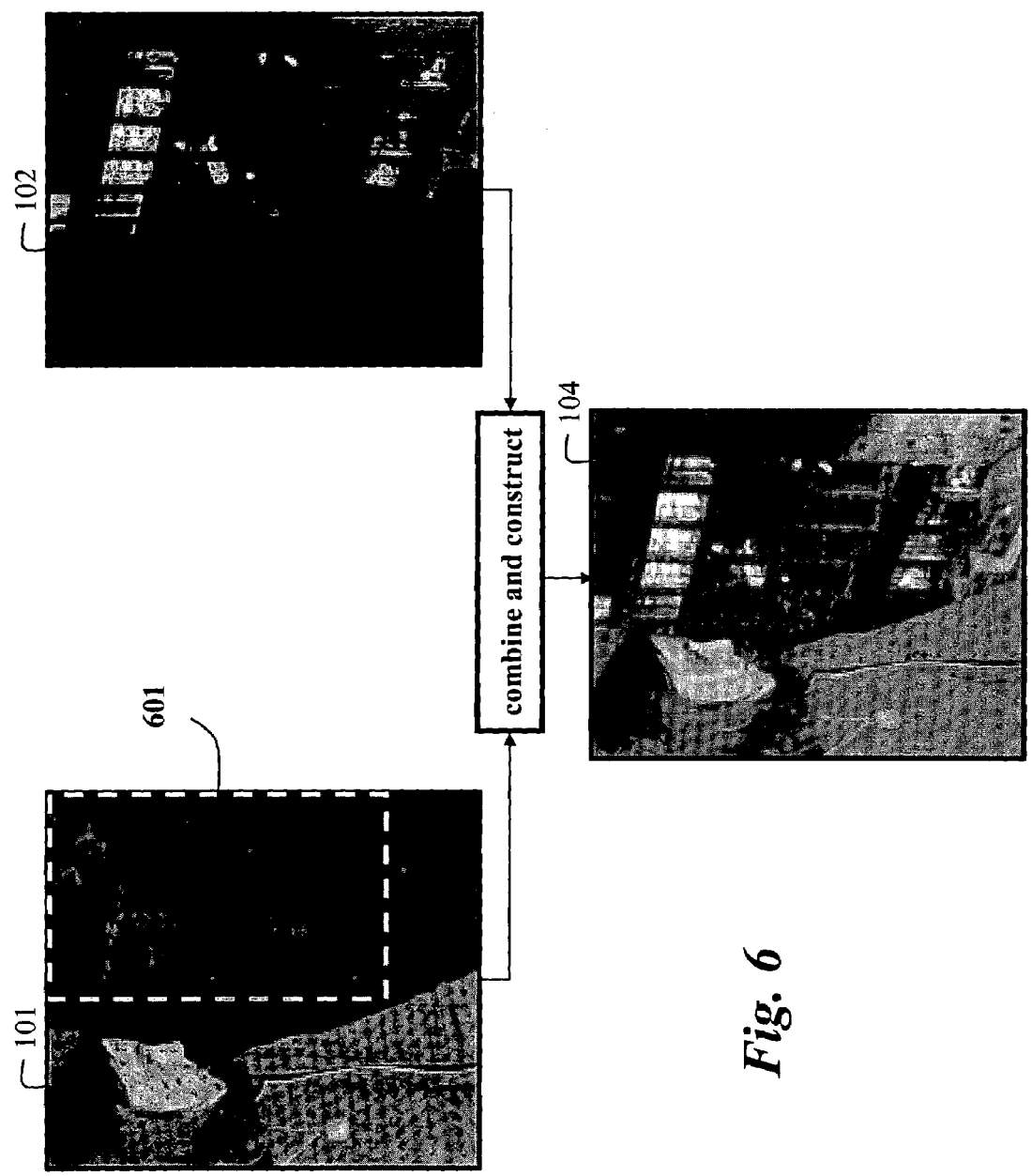
FIG. 6 is a block diagram of a method for combining flash and ambient images according to an embodiment of the invention.

As shown in FIG. 6, a common application is to acquire an image of a person inside a glass enclosed room at night. A 'night scene' mode of the camera is commonly used in such applications.

The person is under-exposed in the ambient image 102. However, the flash image 101 includes reflections 601 of objects in the room. Therefore, it is desired to construct the enhanced image 104 with a well-lit person, a visible background behind the glass, and no flash object reflections.

Clearly, in such scenes, the flash unit does not illuminate distant buildings outside the window. Therefore, we can add the flash image and the ambient image to obtain well lit person and background.

Let H denote the addition of flash and ambient image, and the gradients in the additive image are $\nabla H$. However, the reflection of the person still remains in the additive H. To remove the reflections, we can take the projection 130 of $\nabla H$ on to ambient gradients $\nabla \alpha$. However, the projection is unreliable where the ambient image is under-exposed, e.g., on the person in front of the window.

We generate an under-exposed map where, for each pixel, we determine a weight $w_{ue}$ for the pixel being under-exposed, depending on the intensity of the pixel. At all such pixels, we retain the original flash gradients. Thus, the combined gradient field 103, in this case, becomes $$\nabla \Phi^* = w_{ue} \nabla H + (1 - w_{ue})(\nabla H \to \nabla \alpha).$$

The enhanced image 104 is constructed 140 by integrating the combined gradients $\nabla \Phi^*$ 103.

Depth Compensation

Because the flash brightness falls with the square of the distance from the camera, flashes produce a tunnel effect, where brightness falls of quickly with depth. We use coded depth-orientation information to scale intensities of distant objects in flash images.

A ratio $\beta$, of a linear scale term of the flash and ambient components is $$\beta = \Phi / \alpha = (\rho \cos \theta) / (\pi d^2) / \rho B / \pi = (\cos \theta) / (d^2 B).$$

Assuming, the ambient illumination $B(x, y)$ is uniform or low frequency, we can produce the enhanced image 104 by compensating for $d^2 / \cos \theta$ attenuation. We use the coherency map M to scale gradients in the flash image by $1/\beta$, but only at those locations where the coherency is high. The remaining the flash gradients are left unaltered according to $$\nabla \Phi' = M \nabla \Phi / \beta + (1 - M) \nabla \alpha.$$

Conventional intensity normalization techniques, such as gamma correction, contrast reduction using base and detail images, or nonlinear scaling of gradients, change the overall appearance of the images. In contrast, out method, which uses the $\beta$ map, only applies local scaling.

Figure 7:
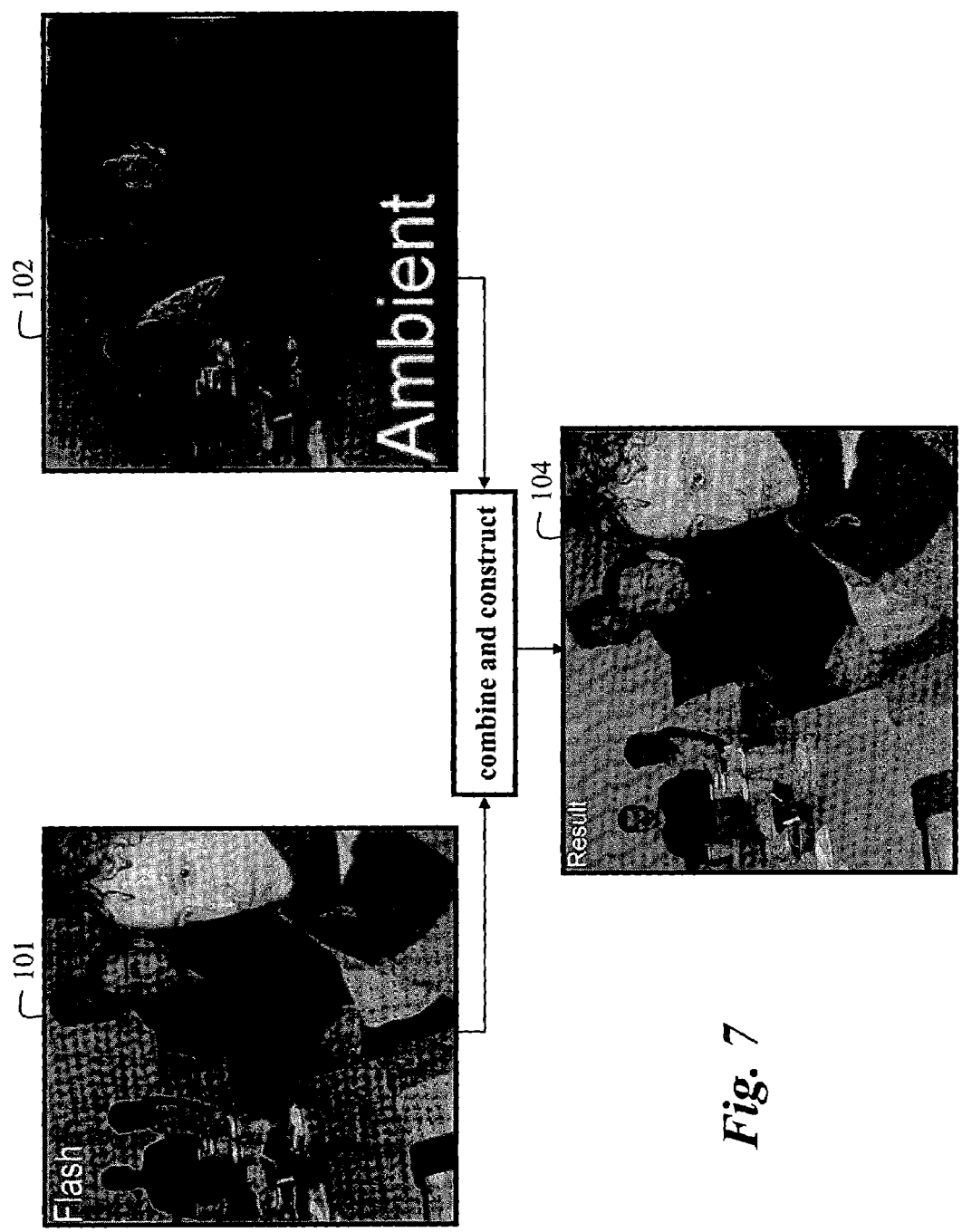
FIG. 7 is a block diagram of a method for combining flash and ambient images according to an embodiment of the invention.

FIG. 7 shows this effect where nearby persons in the flash image 101 are overexposed but underexposed in the ambient image 102, and substantially uniformly illuminated in the enhanced image 104.

HDR Output Image

Figure 9:
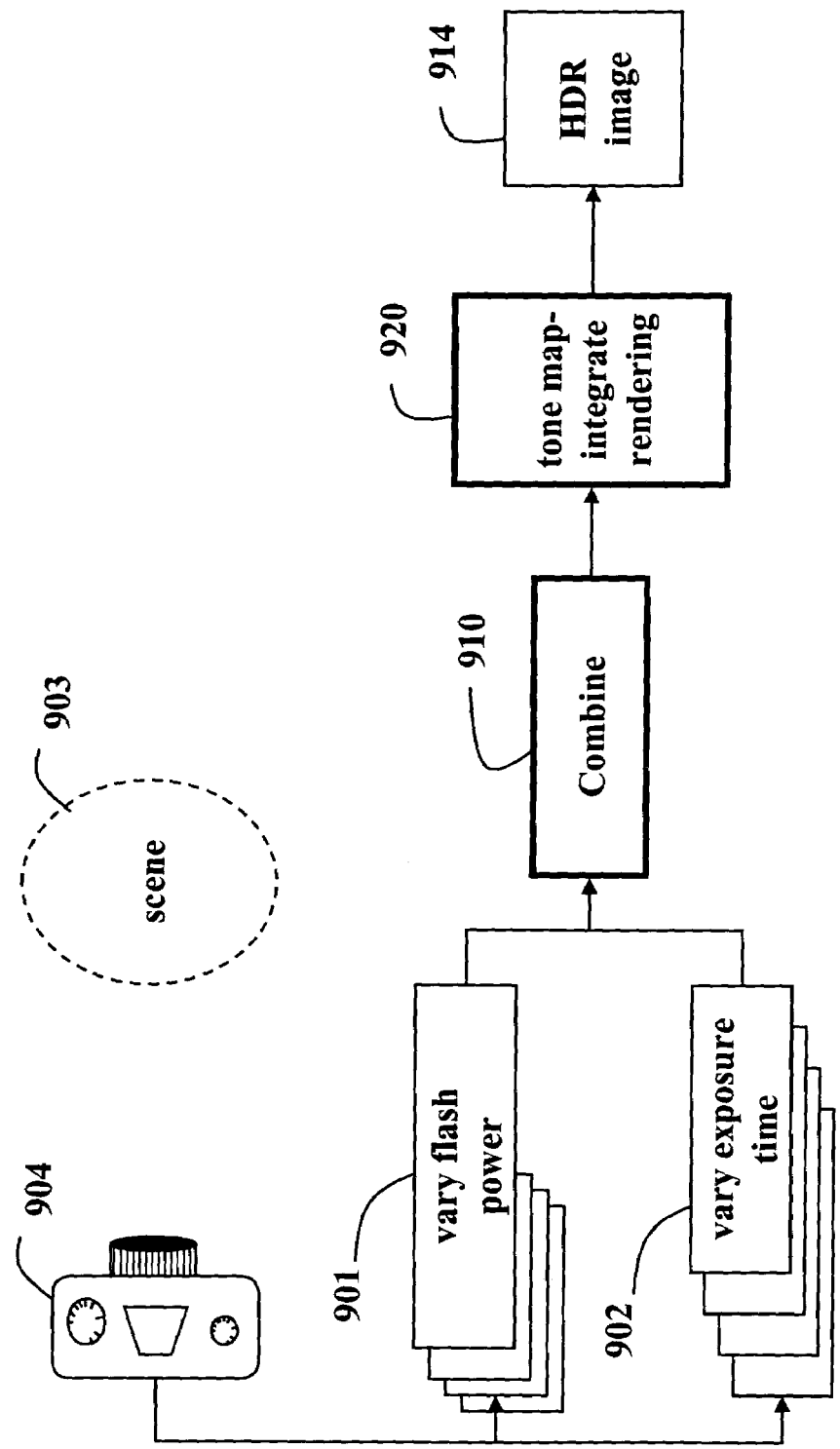
FIG. 9 is a block diagram of a method for acquiring a well-lit image according to one embodiment of the invention.

As shown in FIG. 9, one embodiment of the invention acquires multiple images using different flash powers 901 or, generally, illumination conditions, as well as, optionally, ambient images with different exposure times 902 of a scene 903 with a camera 904. Gradients are determined for each image as described above. The gradient images 901-902 are combined 910 to construct an enhanced output image 914. In the output image as many of the pixels as possible are 'well-lit' by varying the illumination conditions. Thus, in effect, the well-lit image is perceptually comparable to a prior art high dynamic range image (HDR) obtained by varying exposure time. The term well-lit is used because the amount of illumination in the scene is varied to optimally light the scene.

The dynamic range refers to a range of brightness levels in a scene. The dynamic range is typically measured in terms of camera f-stops, each f-stop doubling or halving the brightness of the adjacent f-stop. Most digital camera systems have range of about six f-stops. In the prior art, the dynamic range is extended considerably by acquiring multiple images at different exposure times and blending those image into an output HDR image.

Thus, the prior art HDR image is obtained by varying exposure. This causes the amount of illumination that is captured by the camera to vary, even though the amount of illumination in the scene remains constant. The HDR image according to the invention varies the illumination conditions. Therefore, in this case, the amount of light that is captured by the camera varies even though the exposure time remains constant.

It should be noted that varying the flash power is but one way to change lighting condition in the scene to obtain the HDR image according to the invention. Any of the different lighting conditions described above can also be used in a similar manner.

Figure 10:
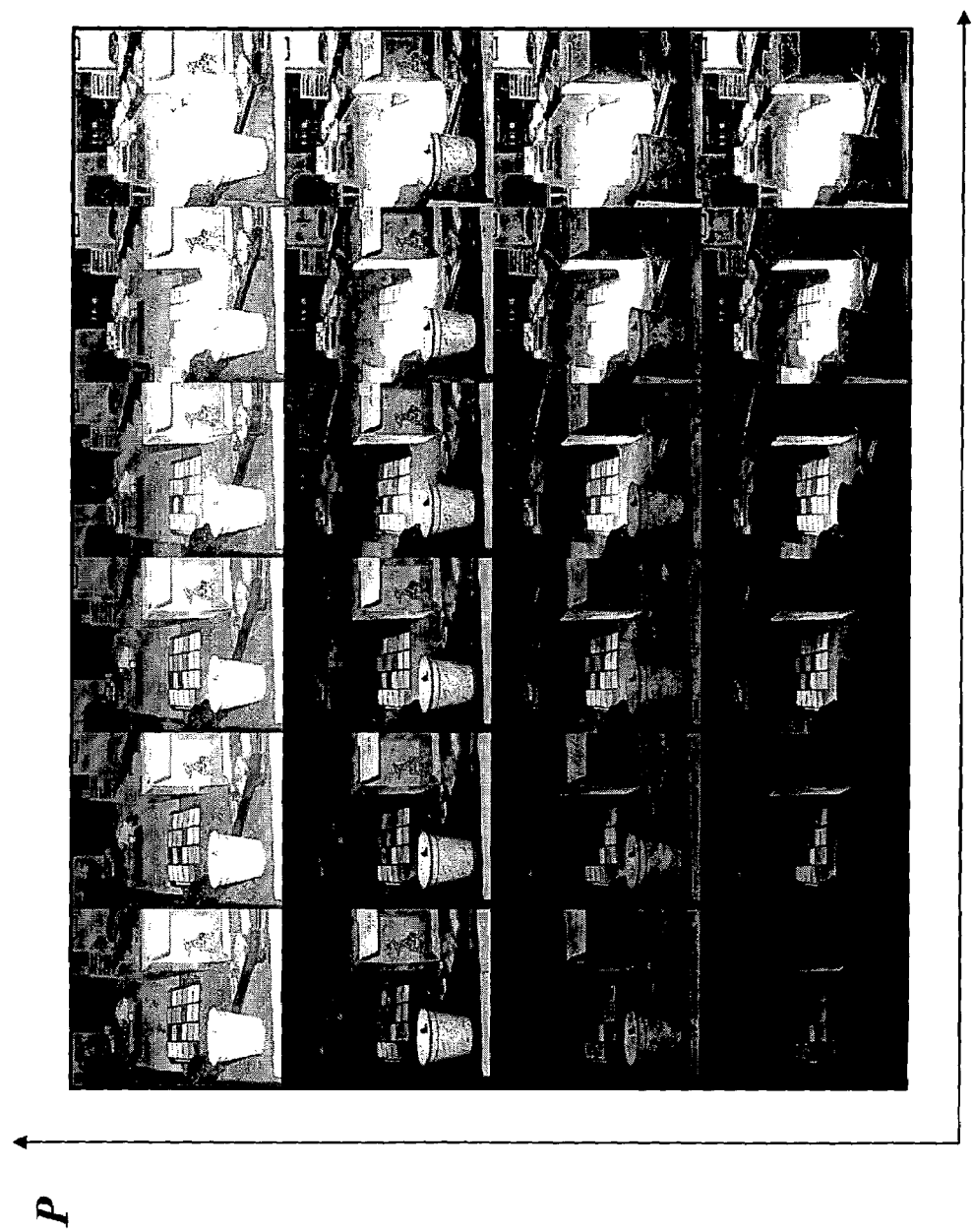
FIG. 10 is a collection of images acquired with varying flash power and exposure time settings.
Figure 11:
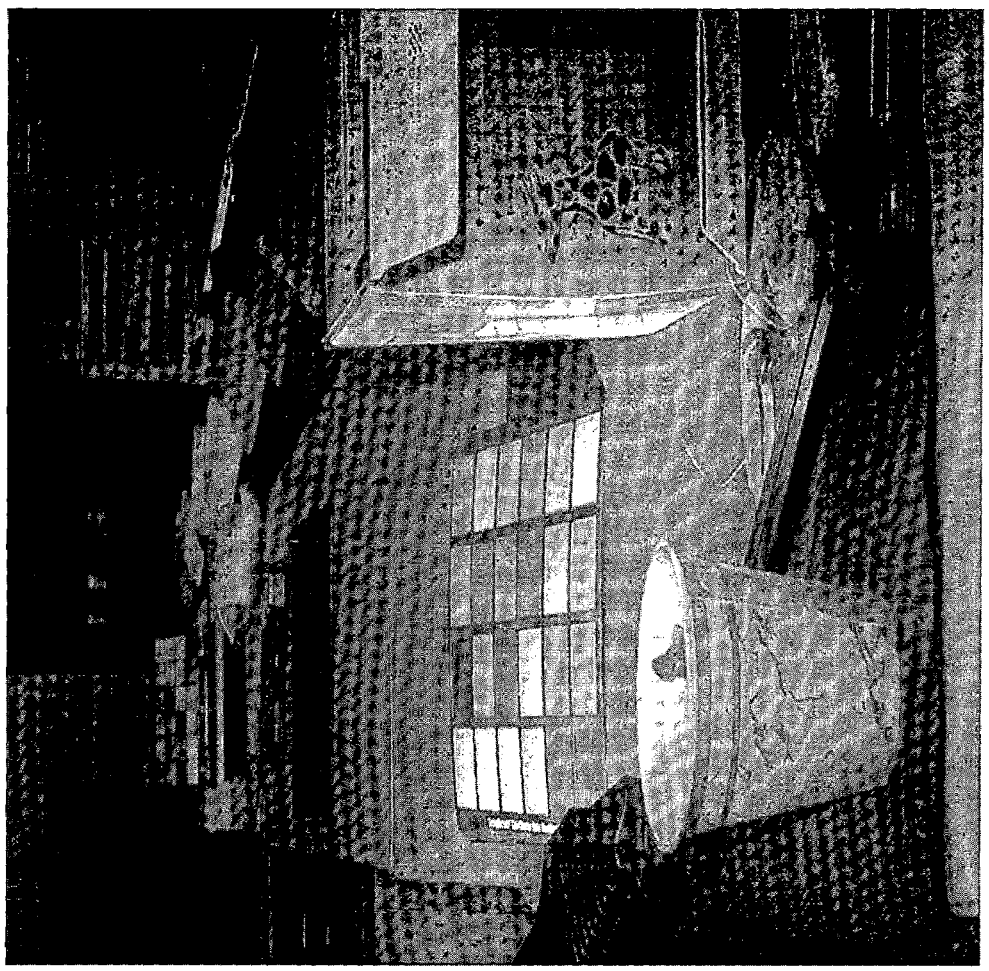
FIG. 11 is an enhanced image acquired with optimal power and exposure settings.

FIG. 10 shows acquired images with different flash power (P) and exposure time (E). Note that the change in illumination due to the change in flash power along the vertical axis is quite different than for change in exposure time along the horizontal axis. FIG. 11 shows the HDR image for the same scene as in FIG. 10.

Conventional exposure time HDR is different from the flash power HDR and also optionally flash-exposure HDR, as described herein for one embodiment of the invention. Two image pixels with the same intensity value for a given (P, E) setting can have different values at a different (P, E) setting.

Rendering

To render 920 the radiance maps $\Phi$ and $\alpha$, we apply two-valued tone mapping to the images during the combining. One tone value is for flash exposure and the other value is for exposure time. The prior art tone mapping is applied to images acquired with varying exposure time and only uses a single tone value. In contrast, we apply tone mapping to images taken with different flash powers and different exposure times. We can also use one-value tone mapping when only flash images are acquired.

Tone mapping compresses the high dynamic range into a displayable range, with all the perceptually-significant features preserved. Specifically, tone mapping generally mimics optical phenomena that are otherwise limited by the dynamic range of the camera. Examples of these are flares or blooming, which are mostly properties of lenses and CCDs, and blue shift due to low light conditions. Tone mapping makes the overall brightness of an image acceptable for viewing, see Reinhard, et al., "Dynamic Range Reduction Inspired by Photoreceptor Physiology," IEEE Transactions on Visualization and Computer Graphics, vol. 11, no. 1, pp. 13-24, January/February 2005, incorporated herein by reference. This is especially important for images that are under-exposed or over-exposed. Tone mapping can use a tone function, see U.S. Pat. No. 6,894,720 issued to Zhang on May 17, 2005, "Method and apparatus for applying tone mapping functions to color images," incorporated herein by reference.

The combined well-lit (HDR) image 914 can be constructed 910 by 'fusing' the flash and exposure radiance maps. We fuse the maps by selecting for each pixel a maximum of the gradient between the flash and exposure HDR image gradient to preserve maximum contrast. We also consider gradient reversal from the flash radiance map $\Phi$map to the ambient radiance map $\alpha$, otherwise nearby pixels can have gradients with opposite orientation, which affects the quality of the fused map. To achieve this, we exploit the coherency map M between $\Phi$ to $\alpha$. We take the maximum of the gradients only if the coherency is substantially high, e.g., higher than some predetermined threshold. Otherwise, we retain the gradients in the flash image if the coherence is less than the threshold.

Let T denote a mask such that T is '1' when the magnitude of the flash gradient $\nabla\Phi$ is greater than the magnitude of the ambient $\nabla\alpha$, and '0' otherwise. Thus, the new 'fused' gradient field $\nabla R$ is defined as $$\nabla R = M(T\nabla\Phi + (1-T)\nabla\alpha) + (1-M)\nabla\Phi.$$

It should be noted that the HDR flash image can be constructed by just fusing the flash images 901, as described above.

After tone mapping, the gradient integration as described above can be used to render the final output image.

Adaptive Flash Power and Exposure Time Settings

Many conventional cameras use internal sensors and processors to estimate appropriate camera settings. Typically, the sensors measure geometry and illumination conditions in a scene. These can then be used to set focus, exposure and flash power, generally, as referred to herein as 'camera settings'. However, the prior art estimate is for a single appropriate camera setting, which is based on an aggregate measurement of the scene before any images are acquired. This can often lead to over- or under-exposure.

It is difficult to determine optimal camera settings, such flash power and exposure time, a priori. The optimal settings should illuminate distant or dark objects in a scene, without saturating nearby or bright objects. This cannot be determined from a beforehand sensing the scene.

One embodiment of the invention can take advantage of the fact that digital cameras can acquire essentially an unlimited number of images. Only optimal images need to be stored or downloaded. Thus, the camera can first acquire one or more 'test' images to determine optimal camera settings.

Instead of sensing the scene, we measure desired properties at the sensing elements. The sensing elements can be pixels in a CCD type of camera sensor, or higher level sensing structures, which may combine several pixels and micro-lenses and filters. The set of properties that are to be optimized can include intensity, wavelength, polarization, and phase of the incident light.

Thus, instead of relying on scene conditions, we measure actual images acquired by the camera to determine optimal camera settings. It should also be noted, that we do not perform complex and time-consuming higher level scene analysis, see U.S. Pat. No. 6,301,440 issued to Bolle, et al., on Oct. 9, 2001, "System and method for automatically setting image acquisition controls." Instead, we simply look at the output of the sensor elements, and measure sensed properties on an element by element basis. Thus, our camera can acquire a large number of images in a very short time, and only retain the last image. To the user, the operation and behavior of our camera appears conventional.

The settings can include polarization, view direction, wavelength of illumination, color balance, focus, zoom, f-stop, exposure, and flash power, flash direction and spatial distribution, and the like.

Figure 8A:
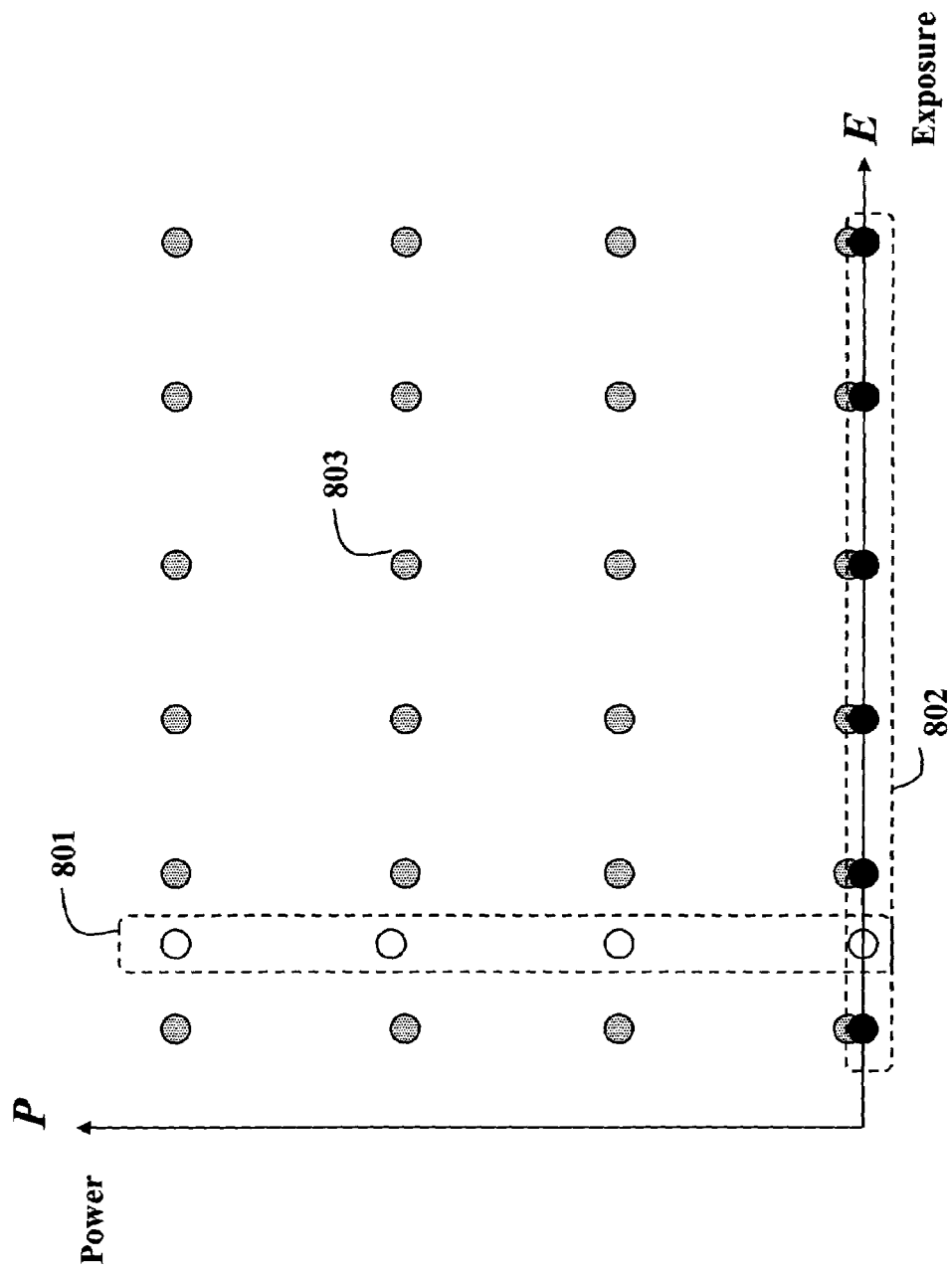
FIG. 8A is graph of a power and exposure space according to one embodiment of the invention.

As shown in FIG. 8A, we can analyze two-dimensional flash powers (P) and shutter exposures times (E) for the example images of FIG. 10. We also provide a method for adaptively sampling this 2D PE-space to estimate a single high quality flash-ambient image pair ($\Phi$, $\alpha$). Then, this pair of images can be used to acquire an enhanced image.

In FIG. 8A, the open circles 801 indicate the dynamic range of images due to varying flash powers, and the closed circles 802 the dynamic range due to varying shutter exposure. The stippled circles 803 indicate the dynamic range due to varying both flash power and exposure time.

Figure 8B:
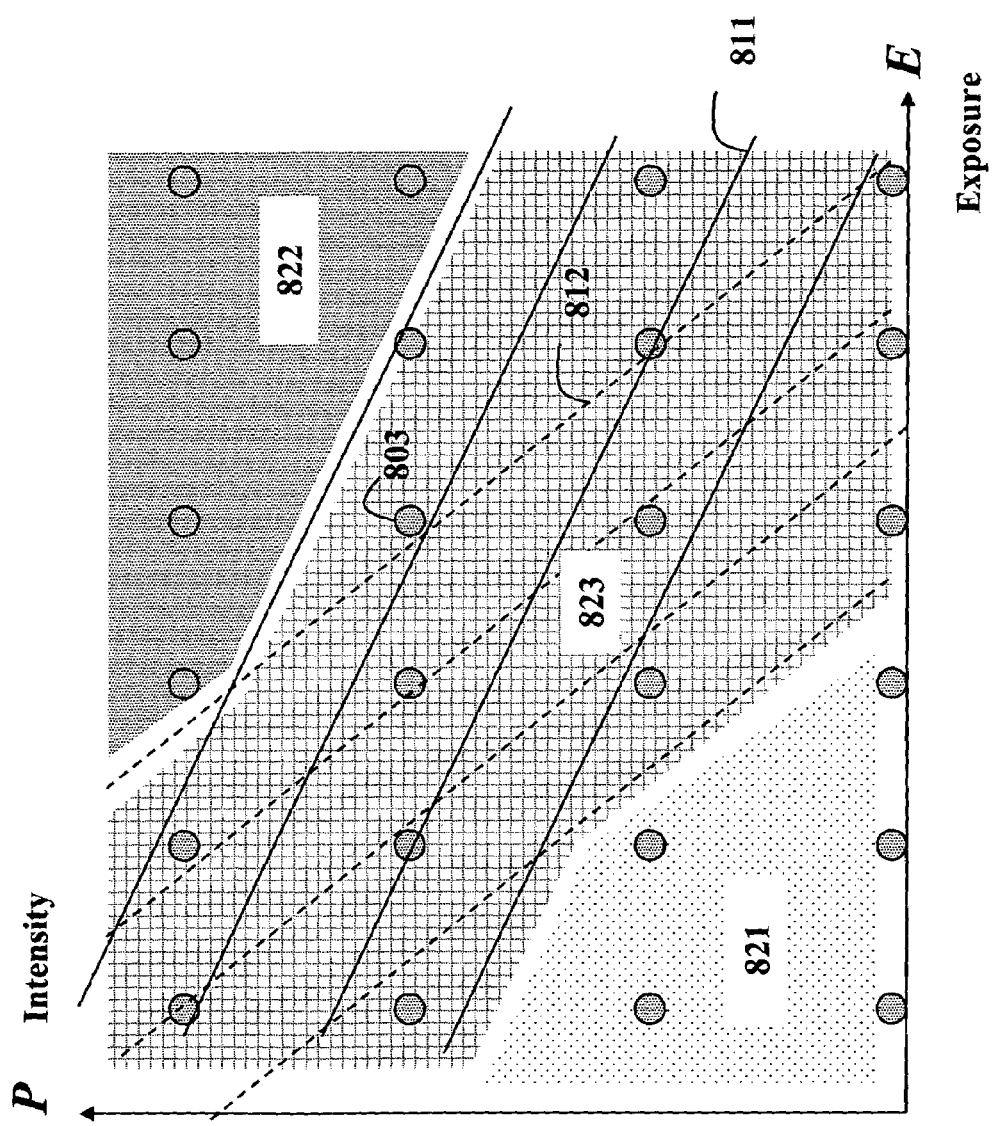
FIG. 8B is a graph of intensity isocontours according to an embodiment of the invention.

Flash power and exposure time provide complementary information. By increasing the exposure time, we can acquire ambient images of objects at increasing depths that would otherwise not illuminated by the flash unit. This is shown in FIG. 8B where solid lines 811 indicate possible isocountours of intensities at one pixel, and dashed lines 812 indicate possible intensity isocontours for another pixel. The stippled areas 821 and 822 indicate, generally, power (P) and exposure (E) settings that cause under and over exposure, respectively.

The area 823 indicates power and exposure settings that generate pixels with 'well-exposed' intensity values, as defined below.

To obtain the above described data, we acquire, for example, $N_F \times N_A$ images 901-902, with $N_F$ different flash powers and $N_A$ different exposure times. After linearizing the camera response, the ambient radiance field $\alpha$ can be estimated using conventional HDR method by using only the $N_A$ ambient samples along the exposure axis E, i.e., the samples having varying exposure times. The flash radiance field $\Phi$ can be estimated using a flash-HDR method by using $N_F$ samples parallel to the P axis, which have varying flash powers at a fixed exposure E*.

However, many of the pixel intensities 821-822 in these samples, being either under or over exposed, are outside a usable range of intensities of 'well-exposed' pixels.

As defined herein a 'well-exposed' pixel has an intensity in about the middle two-third range, for example, 50-220 in a range [0, 255], or 0.2-0.85 in a normalized range [0, 1]. It should be noted that these values can vary for different cameras. But, generally, well-exposed pixels are neither under- nor over-exposed. Well-exposed pixels are measured according to a SNR or 'goodness' measure. Well-exposed is but one desirable property at a sensing element, e.g., a pixel.

Figure 12:
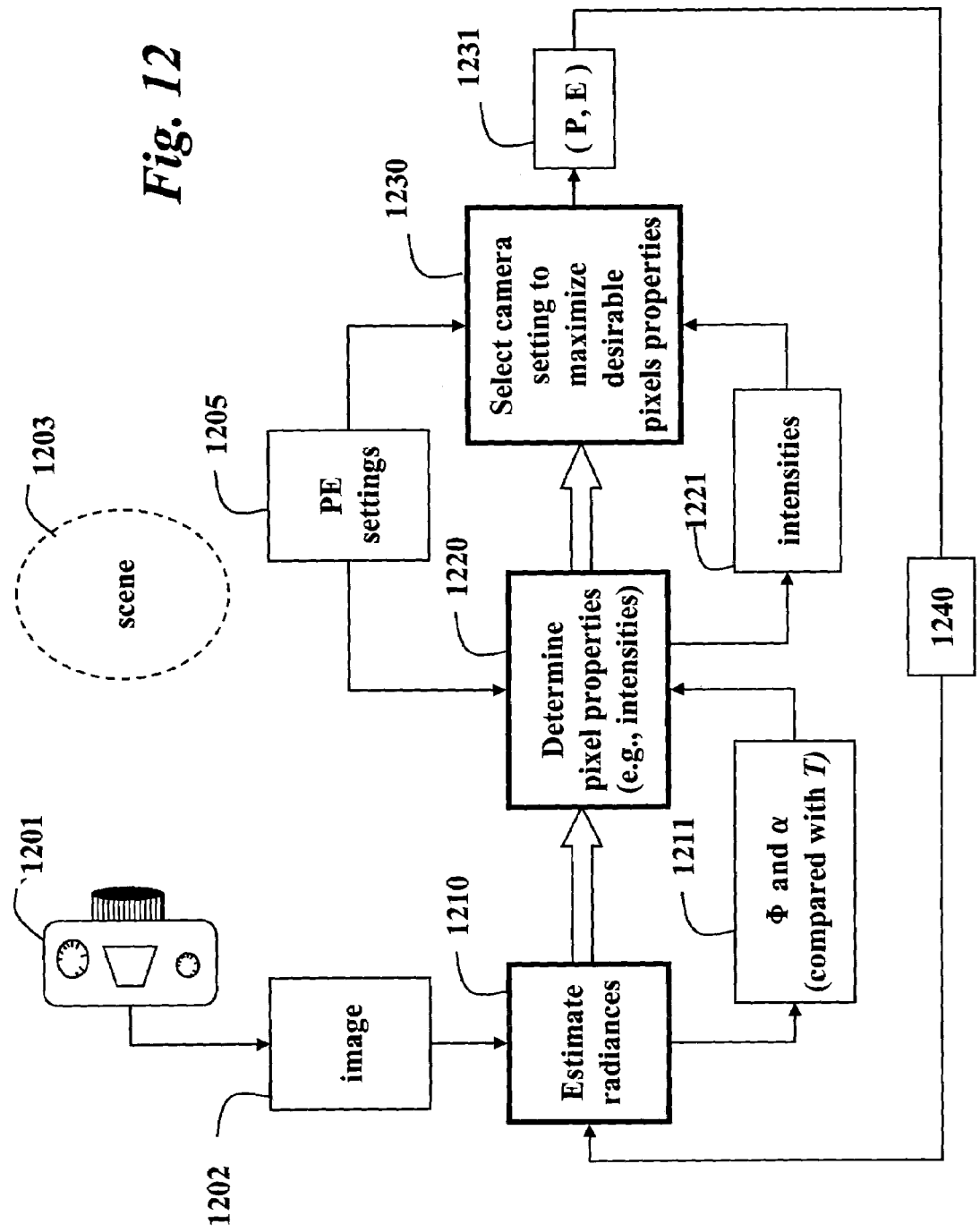
FIG. 12 is a block diagram for adaptively setting camera parameters according to an embodiment of the invention.

We can analyze the PE-space, and retain combined flash-exposure values for each pixel with well-exposed intensities as shown in FIG. 12.

For each pixel k in an image 1202, the $N_F \times N_A$ equation for each flash and exposure pair ($P^i$, $E^i$) can be expressed as $$I_k^{i,j} = \Phi_k P^i + \alpha_k E^j.$$

Then, for each pixel, we solve the system of $N_F \times N_A$ linear equations as a least-square system of corresponding pixels to estimate 1210 the two unknowns $\Phi_k$ and $\alpha_k$. We can also weight each linear equation by a confidence $\Gamma(I_k^{i,j})$, to obtain a weighed least squares solution where $\Gamma(.)$ is the SNR, or the 'goodness' measure of a pixel intensity at a particular camera ISO setting.

Figure 8C:
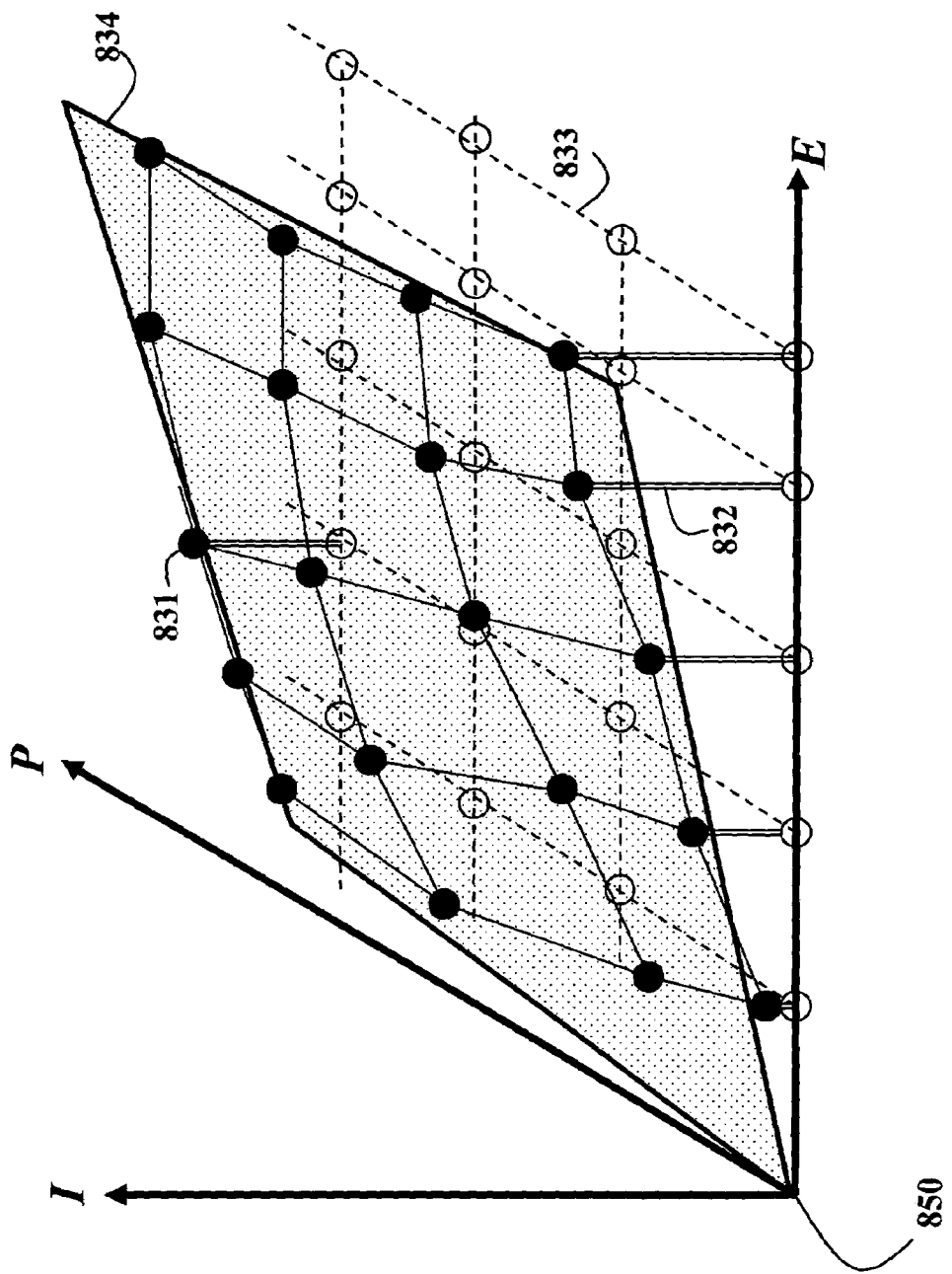
FIG. 8C is a graph of a plane fitted to the power and exposure space according to an embodiment of the invention.

As shown in FIG. 8C, noisy intensity values 832, I, form a height field over the PE grid for each pixel. Finding appropriate $\Phi$ and $\alpha$ values using the least-squares method described above corresponds to fitting a plane 834 to this surface. The plane passes through the origin 850 of the PE grid.

The fitting of the plane 834 is shown in FIG. 8C, where the axes are pixel intensity (I), shutter exposure (E), and flash power (P). The closed circles 831 are pixel intensities (height) 832 for various flash power (P) and shutter exposure (E) settings in the PE grid 833. The plane 834 is fitted to the pixel intensities 832.

The PE-space has a wealth of information. The isocontour lines 811 for a power value μ at a single pixel are given by $\Phi P^i + \alpha E^j = \mu$. The isocontour lines are naturally parallel. The lines are vertical for distant objects not illuminated in the flash image, horizontal for nearby objects not illuminated in ambient image, and in general, slanted with negative slope for illuminated objects in both images. For diffuse reflection, the slope is approximately $\beta = \cos(\theta)/Bd^2$, which is independent of texture.

Adaptive Sampling of the PE Space

In practical scenarios, capturing all the $N_f \times N_a$ images is time-consuming and cumbersome. It is desired to minimize the number of images required to obtain the high dynamic range scene and to automatically determine optimal flash and exposure setting for a camera to obtain an enhanced image. The goal is to maximize the number of pixels with well-exposed intensity values, excluding those pixels that have been measured with high SNR in previously acquired images.

We describe a method for selecting a minimum number of samples using a 'walk' in the PE space, and a method to estimate the optimal flash power Φ and shutter exposure time α for a camera from those selected samples.

The object is to have the camera automatically select appropriate flash power and shutter exposure time settings for a next image, as well as other optional settings, in order to maximize a number of pixels having a set of desired properties. That is, the object is to sample flash and exposure components, Φ and α, in a well-exposed pixel intensity band.

As shown in FIG. 12, a camera 1201 acquires an initial image 1202 of a scene 1203 using predetermined exposure and flash power settings. For example, the settings are manual, or determined by conventional sensors in the camera 1201. Estimates 1210 of the radiances Φ and α 1211 are obtained for each pixel in the pair of images. As described below, these values can be compared against a threshold T.

For the next informative samples for P and E, in general, the samples perpendicular to the flash power isocontours are most useful. For example, if α is very small compared to Φ, then varying flash power is more useful than varying exposure time. However, if the scene is generally under-exposed but for a saturated area, increasing the power will only increase the size of the hot spot. In this case, it is probably better to increase exposure.

After taking h images, the search for the flash power and exposure time pair $(P^{h+1}, E^{h+1})$ for the $h+1^{th}$ image proceeds as follows.

First, we predict the intensity of a pixel using the current estimate $(\Phi^h_k, \alpha^h_k)$, for the $k^{th}$ pixel for a candidate (P, E), using $$I_k^{h+1} = \Phi^h_k P^{h+1} + \alpha^h_k E^{h+1}.$$

Next, we estimate 1220 the intensity 1221 of the $k^{th}$ pixel for each possible discrete value of (P, E) 1205, i.e., possible camera setting, and select 1230 the (P, E) 1231 that maximizes the overall number of well-exposed pixels.

Let Γ(.) denote the SNR or the 'goodness' measure function. Because our goal is to sense both flash and ambient illumination components for well-exposed pixels, the well-exposed intensity for a particular pixel is the minimum of the component intensities, i.e., $$\min(\Gamma(\Phi P), \Gamma(\alpha E), \Gamma(I)).$$

By taking the minimum, we ensure that all three components are measured well.

We exclude pixels which have already been sampled with a well-exposed intensity in previous images. Otherwise, 'well-exposed' pixels always dominate the flash power exposure parameter estimation, keeping the estimate close to the current (P, E) values.

To exclude well-exposed pixels, we take the maximum of the well-exposed intensity over h+1 intensity samples at a pixel:

$$\sum_k \min\left(\max_{j=1\ldots h+1} \Gamma(\Phi^j_k P^j_k) + \max_{j=1\ldots h+1} \Gamma(\alpha^j_k E^j_k) + \Gamma(I^{h+1}_k)\right).$$

After a pixel is measured as well-exposed, by taking the maximum, we can avoid changing the SNR value for that pixel, i.e., the SNR is 'clamped' to the maximum, thus effectively eliminating the effect of that pixel in the minimization.

We determine the (P, E) setting 1231, which maximizes the sum of the SNR over all pixels k.

It is possible to iterate 1240 the above steps as follows. With new measurements, we update the estimates 1211 $\Phi_k^{h+1}, \alpha_k^{h+1}$ by adding a new constraint for the $k^{th}$ pixel using Equation (1). If the update of Φ and α 1211 is below a predetermined threshold T, then all useful samples have been processed, and we terminate. Otherwise, we continue the process to find the next best $(P^{h+2}, E^{h+2})$ parameters.

EFFECT OF THE INVENTION

A method and system for improving images acquired under flash and ambient illumination are provided. Three known problems are addressed: over- or under-illumination at a given flash power; reflections or highlights; and illumination attenuation over depth. Artifacts in flash images can be reduced by using information in an ambient image.

To overcome a limited dynamic range in flash and ambient images, a flash-exposure space is sampled adaptively. By gaining an understanding of the flash exposure space, better cameras can be designed as well novel image synthesis effects.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A method for generating an enhanced output image, comprising the steps of:
   acquiring an ambient image of a scene illuminated by ambient light;
   acquiring a flash image of the scene illuminated with a flash unit;
   determining a gradient flash image from the flash image;
   determining a gradient ambient image from the ambient image;
   combining the gradient flash image and the gradient ambient image to produce a combined gradient image;
   constructing an enhanced output image from the combined gradient image; in which the flash image is due to a flash radiance Φ scaled by a flash power P, and the ambient image is due to an ambient radiance α scaled by an exposure time E, and wherein flash gradients in the gradient flash image are ∇Φ and ambient gradients in the gradient ambient image are ∇α; and in which a coherence map for the gradient flash image and the gradient ambient image is $$M = \frac{|\nabla \Phi \cdot \nabla \alpha|}{|\nabla \Phi||\nabla \alpha|}.$$

2. The method of claim 1, in which a gradient coherence model is $\nabla \Phi = k \nabla \alpha$, where k is a scalar.

3. The method of claim 1, in which a symbol $\rightarrow$ denotes projecting, and the combining of the gradient flash image and the gradient ambient image is $$\nabla \Phi = (\nabla \Phi' \rightarrow \nabla \alpha) = \nabla \alpha (\nabla \Phi' \cdot \nabla \alpha)/\|\nabla \alpha\|^2,$$

where the vector $\nabla \Phi$ is along the vector $\nabla \Phi$ and k is a scalar value.

4. The method of claim 1, in which the combined gradient image is $$\nabla \Phi^* = w_S \nabla \alpha + 1(1-w_S)(M \nabla \Phi' + (1-M) \nabla \alpha,$$

wherein $w_S$ are weights.

5. The method of claim 4, in which the weights $w_S$, are a function of normalized pixel intensities.

6. The method of claim 1, in which a symbol $\rightarrow$ denotes projecting, and the combined gradient image is $$\nabla \alpha^* = w_S \nabla \alpha' + (1-w_S)(\nabla \alpha' \rightarrow \nabla \Phi),$$

wherein $w_S$ are weights.

7. The method of claim 1, in which the constructing further comprises:
  integrating gradients in the combined gradient image.

8. The method of claim 1, further comprising:
  generating a residual image according to $\nabla \eta_A = (1-w_S)[\nabla \alpha' - (\nabla \alpha' \cdot \nabla \Phi)]$,
  where $w_S$ are weights, and $\nabla \eta_A$ represents noise in the ambient image.

9. The method of claim 1, in which a symbol $\rightarrow$ denotes projecting, and further comprising:
  adding the gradient flash image and the gradient ambient image to produce an additive gradient image $\nabla H$, and the combined gradient image is $$\nabla \Phi^* = w_{ue} \nabla H + (1-w_{ue})(\nabla H \rightarrow \nabla \alpha),$$

where $w_S$ are weights.

10. The method of claim 1, in which the combined gradient field is $$\nabla \Phi' = M \nabla \Phi / \beta + (1-M) \nabla \alpha,$$

where β is a linear scaling term.

11. The method of claim 1, in which the flash image is acquired while the scene is also illuminated by the ambient light, and further comprising:
  subtracting the ambient image from flash image before determining the gradient flash image.

12. A system for generating an enhanced output image, comprising:
  a camera configured to acquire a first image of a scene illuminated by a first illumination condition and a second image of the scene illuminated by a second illumination condition;
  means for determining a first gradient image from the first image;
  means for determining a second gradient image from the second image;
  means for comparing the first gradient image and the second gradient image to produce a combined gradient image;
  means for constructing an enhanced output image from the combined gradient image;
  wherein the first illumination condition is produced by a flash unit, and the second illumination condition is ambient lighting;
  in which the first image is due to a flash radiance Φ scaled by a flash power P, and the second image is due to an ambient radiance α scaled by an exposure time E, and wherein flash gradients in the first gradient image are $\nabla \Phi$ and ambient gradients in the second gradient image are $\nabla \alpha$; and
  in which a coherence map for the first gradient image and the second gradient image is $$M = \frac{|\nabla \Phi \cdot \nabla \alpha|}{|\nabla \Phi||\nabla \alpha|}.$$

13. A method for generating an enhanced output image, comprising the steps of:
  acquiring a first image of a scene illuminated by a first illumination condition;
  acquiring a second image of the scene illuminated by a second illumination condition;
  determining a first gradient image from the first image;
  determining a second gradient image from the second image;
  comparing an orientation of gradients in the first gradient image and the second gradient image to produce a combined gradient image;
  constructing an enhanced output image from the combined gradient image;
  in which the first illumination condition is produced by a flash unit and the second illumination condition is produced by ambient lighting;
  in which the first image is due to a flash radiance Φ scaled by a flash power P, and the second image is due to an ambient radiance α scaled by an exposure time E, and wherein flash gradients in the first gradient image are $\nabla \Phi$ and ambient gradients in the second gradient image are $\nabla \alpha$; and
  wherein a coherence map for the first gradient image and the second gradient image is $$M = \frac{|\nabla \Phi \cdot \nabla \alpha|}{|\nabla \Phi||\nabla \alpha|}.$$

14. The method of claim 13, in which a gradient vector for each pixel in the combined gradient image has a magnitude of a gradient vector of a pixel at a corresponding location in the first gradient image and an orientation of a gradient vector of a pixel at a corresponding location in the second gradient image.

15. The method of claim 13, in which the combining further comprises:
  projecting, for each pixel in the first gradient image, a gradient vector onto a gradient vector of a corresponding pixel in the second gradient image to obtain a combined gradient vector for a corresponding pixel in the combined gradient image.

* * * * *